US012298379B2

(12) United States Patent
Trainin et al.

(10) Patent No.: US 12,298,379 B2
(45) Date of Patent: May 13, 2025

(54) RADAR-BASED RADIO FREQUENCY (RF) SENSING

(71) Applicant: QUALCOMM Incorporated, San Diego, CA (US)

(72) Inventors: Solomon Trainin, Haifa (IL); Assaf Yaakov Kasher, Haifa (IL); Alecsander Petru Eitan, Haifa (IL); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 637 days.

(21) Appl. No.: 17/584,865

(22) Filed: Jan. 26, 2022

(65) Prior Publication Data

US 2023/0236303 A1 Jul. 27, 2023

(51) Int. Cl.
*G01S 13/42* (2006.01)
(52) U.S. Cl.
CPC .................. *G01S 13/42* (2013.01)
(58) Field of Classification Search
CPC ....................................... G01S 13/42
USPC ...................................... 342/146
See application file for complete search history.

(56) References Cited

U.S. PATENT DOCUMENTS

| 3,183,506 A | * | 5/1965 | Webb ............... | G01S 13/325 |
| | | | | 342/132 |
| 4,704,613 A | * | 11/1987 | Albanese ............... | G01S 11/10 |
| | | | | 342/458 |
| 5,280,294 A | * | 1/1994 | Hammerquist ......... | G01S 5/12 |
| | | | | 342/146 |

(Continued)

FOREIGN PATENT DOCUMENTS

| EP | 4043917 A1 | 8/2022 | |
| WO | WO-2019043749 A1 | * 3/2019 | .......... G01S 13/003 |
| WO | WO-2021083368 A1 | 5/2021 | |

OTHER PUBLICATIONS

Partial International Search Report—PCT/US2022/080816—ISA/EPO—Apr. 6, 2023.
Silva C.R.C.M.D., et al., "Beamforming Training for IEEE 802.11ay Millimeter Wave Systems", 2018 Information Theory and Applications Workshop (ITA), IEEE, Feb. 11, 2018, pp. 1-9, XP033425534, 6 Pages, abstract.

(Continued)

*Primary Examiner* — Nuzhat Pervin
(74) *Attorney, Agent, or Firm* — Holland & Hart / QUALCOMM Incorporated

(57) ABSTRACT

This disclosure provides systems, methods and apparatus, including computer programs encoded on computer storage media, for radio frequency (RF) sensing in the millimeter-wave frequency spectrum that can be performed over multiple phases. During a session setup phase, a radar initiator identifies one or more wireless stations (STAs) that are capable of radar ranging and sets up a radar measurement session that includes at least one of the identified STAs. During a measurement negotiation phase, the radar initiator performs a respective beamforming training operation with each STA and indicates, to each STA, one or more parameters associated with the radar measurement session. During a radar measurement phase, the radar initiator transmits radar setup information to, and receives ranging information from, each STA. In some aspects, the radar initiator may perform an object detection operation that indicates a location of an object associated with the ranging information received from each radar STA.

29 Claims, 17 Drawing Sheets

(56) References Cited

U.S. PATENT DOCUMENTS

| | | | | |
|---|---|---|---|---|
| 5,442,364 | A * | 8/1995 | Lee | H01Q 3/22 |
| | | | | 342/25 C |
| 6,639,545 | B1 * | 10/2003 | Hager | G01S 13/524 |
| | | | | 342/107 |
| 10,117,218 | B2 * | 10/2018 | Markhovsky | G01S 5/0218 |
| 10,433,274 | B2 * | 10/2019 | Jamieson | H04B 17/12 |
| 10,605,911 | B1 * | 3/2020 | Parker | G01S 13/42 |
| 10,898,757 | B1 * | 1/2021 | Johansson | G01S 13/89 |
| 11,102,744 | B2 * | 8/2021 | Zhang | H04L 27/2655 |
| 11,159,958 | B1 * | 10/2021 | Hatamian | H04W 4/38 |
| 11,172,542 | B1 * | 11/2021 | Kalkunte | H04W 72/21 |
| 11,382,136 | B2 * | 7/2022 | Deng | H04B 7/0617 |
| 11,402,462 | B2 * | 8/2022 | Driscoll | G01S 13/42 |
| 2003/0169945 | A1 * | 9/2003 | Stanek | G01S 3/7865 |
| | | | | 382/296 |
| 2005/0128126 | A1 * | 6/2005 | Wolframm | G01S 13/9023 |
| | | | | 342/25 C |
| 2009/0189800 | A1 * | 7/2009 | Benari | G01S 7/4052 |
| | | | | 342/134 |
| 2012/0001787 | A1 * | 1/2012 | van Dorp | G01S 13/46 |
| | | | | 342/28 |
| 2012/0268308 | A1 * | 10/2012 | Tuttle | G01S 13/582 |
| | | | | 342/104 |
| 2014/0168005 | A1 * | 6/2014 | Cheng | G01S 13/103 |
| | | | | 342/134 |
| 2016/0103214 | A1 * | 4/2016 | Clark | G01S 13/723 |
| | | | | 342/59 |
| 2017/0215131 | A1 * | 7/2017 | Qi | H04W 76/10 |
| 2017/0240180 | A1 * | 8/2017 | Hirai | G05D 1/0259 |
| 2019/0320407 | A1 * | 10/2019 | Goyal | H04L 41/5058 |
| 2019/0383931 | A1 * | 12/2019 | Fujitsu | G01S 13/589 |
| 2020/0068520 | A1 * | 2/2020 | Marri Sridhar | H04W 8/005 |
| 2020/0088840 | A1 * | 3/2020 | Stokes | G01S 13/937 |
| 2020/0150263 | A1 * | 5/2020 | Eitan | G01S 13/003 |
| 2020/0163040 | A1 * | 5/2020 | Trichopoulos | G01S 5/0273 |
| 2020/0408892 | A1 * | 12/2020 | Choi | G01S 13/72 |
| 2021/0055739 | A1 * | 2/2021 | Huang | G01S 17/88 |
| 2021/0160712 | A1 * | 5/2021 | Tadayon | H04W 36/16 |
| 2021/0235285 | A1 * | 7/2021 | Guerena | H04W 16/28 |
| 2021/0270937 | A1 * | 9/2021 | Hakobyan | G01S 7/2813 |
| 2021/0311169 | A1 * | 10/2021 | Liu | G01S 7/417 |
| 2022/0039080 | A1 * | 2/2022 | Khoryaev | H04W 4/40 |
| 2022/0066018 | A1 * | 3/2022 | Han | G01S 7/0232 |
| 2022/0217562 | A1 * | 7/2022 | Tang | H04W 24/10 |
| 2022/0225063 | A1 * | 7/2022 | Marschalkowski | G01S 13/56 |
| 2022/0264322 | A1 * | 8/2022 | Choi | H04B 7/0695 |
| 2022/0268912 | A1 * | 8/2022 | Zhang | H04W 4/02 |
| 2022/0373645 | A1 * | 11/2022 | Travnikar | G01S 13/42 |
| 2022/0400532 | A1 * | 12/2022 | Kalkunte | H04W 24/04 |
| 2023/0039386 | A1 * | 2/2023 | Kalkunte | H04W 52/143 |
| 2023/0072423 | A1 * | 3/2023 | Osborn | G16H 20/30 |
| 2023/0082823 | A1 * | 3/2023 | Sato | G01S 7/356 |
| | | | | 342/107 |
| 2023/0152441 | A1 * | 5/2023 | Handa | G06T 7/74 |
| | | | | 342/55 |
| 2023/0160996 | A1 * | 5/2023 | Murakami | G01S 13/003 |
| | | | | 342/146 |
| 2023/0243949 | A1 * | 8/2023 | Han | G01S 7/4812 |
| | | | | 342/118 |

OTHER PUBLICATIONS

International Search Report and Written Opinion—PCT/US2022/080816—ISA/EPO—May 30, 2023.

* cited by examiner

RADAR-BASED RADIO FREQUENCY (RF) SENSING

TECHNICAL FIELD

This disclosure relates generally to radio frequency (RF) sensing, and more specifically, to radar-based RF sensing techniques.

DESCRIPTION OF THE RELATED TECHNOLOGY

Wireless communication devices communicate by transmitting and receiving electromagnetic signals in the radio frequency (RF) spectrum. The operating environment of the wireless communication devices affects the propagation of the electromagnetic signals. For example, electromagnetic signals transmitted by a transmitting device may reflect off objects and surfaces in the environment before reaching a receiving device located a distance away. Accordingly, the amplitudes or phases of the electromagnetic signals received by the receiving device may depend, at least in part, on the characteristics of the environment.

RF sensing is a technique for sensing objects or movement in an environment based, at least in part, on the transmission and reception of electromagnetic signals. More specifically, changes in the environment can be detected based on changes in the electromagnetic signals (such as phase or amplitude) propagating through the environment. For example, a person moving through the environment interferes with the electromagnetic signals that are transmitted by a transmitting device. A receiving device may detect and characterize such changes to its received signals to determine the speed or direction of the person's movement.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method can be performed by a wireless communication device to detect objects in a surrounding environment. In some implementations, the method can include performing a first beamforming training operation that indicates a distance and direction of a first wireless station (STA); transmitting, to the first STA, first radar setup information associated with a radar measurement session; receiving, from the first STA, first ranging information associated with the radar measurement session; and performing an object detection operation that indicates a location of an object associated with the first ranging information and the distance and direction of the first STA.

In some implementations, the method may further include performing a second beamforming training operation that indicates a distance and direction of a second STA; transmitting, to the second STA, second radar setup information associated with the radar measurement session; and receiving, from the second STA, second ranging information associated with the radar measurement session, where the location indicated by the object detection operation is further associated with the second ranging information and the distance and direction of the second STA. In such implementations, each of the first radar setup information and the second radar setup information may indicate an order of first and second radar ranging operations performed by the first and second STAs, respectively, where the first radar ranging operation is associated with the first ranging information and the second radar ranging operation is associated with the second ranging information.

Another innovative aspect of the subject matter described in this disclosure can be implemented in a wireless communication device. The wireless communication device can include a processing system and an interface. In some implementations, the interface may be configured to transmit, to a first STA, first radar setup information associated with a radar measurement session and receive, from the first STA, first ranging information associated with the radar measurement session; and the processing system may be configured to perform a first beamforming training operation that indicates a distance and direction of the first STA and perform an object detection operation that indicates a location of an object associated with the first ranging information and the distance and direction of the first STA.

In some implementations, the processing system may be further configured to perform a second beamforming training operation that indicates a distance and direction of a second STA. In such implementations, the interface may be further configured to transmit, to the second STA, second radar setup information associated with the radar measurement session and receive, from the second STA, second ranging information associated with the radar measurement session, the location indicated by the object detection operation being further associated with the second ranging information and the distance and direction of the second STA.

Another innovative aspect of the subject matter described in this disclosure can be implemented as a method of wireless communication. The method can be performed by a wireless communication device to provide ranging information to a radar initiator. In some implementations, the method can include receiving, from a radar initiator, radar setup information associated with a radar measurement session; performing a first radar ranging operation associated with the radar setup information, where the first radar ranging operation indicates a distance or a direction of an object in relation to the wireless communication device; and transmitting, to the radar initiator, first ranging information associated with the distance or the direction of the object indicated by the first radar ranging operation.

In some implementations, the method may further include receiving, from the radar initiator, position information indicating a distance and direction of a STA; performing a coordinate conversion operation associated with the distance and direction of the STA, where the coordinate conversion operation indicates a distance or a direction of the object in relation to the STA; and transmitting, to the STA, second ranging information indicating the distance or the direction of the object in relation to the STA.

Another innovative aspect of the subject matter described in this disclosure can be implemented in a wireless communication device. The wireless communication device can include a processing system and an interface. In some implementations, the interface may be configured to receive, from the radar initiator, radar setup information associated with a radar measurement session; the processing system may be configured to perform a first radar ranging operation associated with the radar setup information, where the first radar ranging operation indicates a distance or a direction of an object in relation to the wireless communication device; and the interface may be further configured to transmit, to the radar initiator, first ranging information associated with the distance or the direction of the object indicated by the first radar ranging operation.

In some implementations, the interface may be further configured to receive, from the radar initiator, position information indicating a distance and direction of a STA; the processing system may be further configured to perform a coordinate conversion operation associated with the distance and direction of the STA indicated by the beamforming training operation, the coordinate conversion operation indicating a distance or a direction of the object in relation to the STA; and the interface may be further configured to transmit, to the STA, second ranging information indicating the distance or the direction of the object in relation to the STA.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
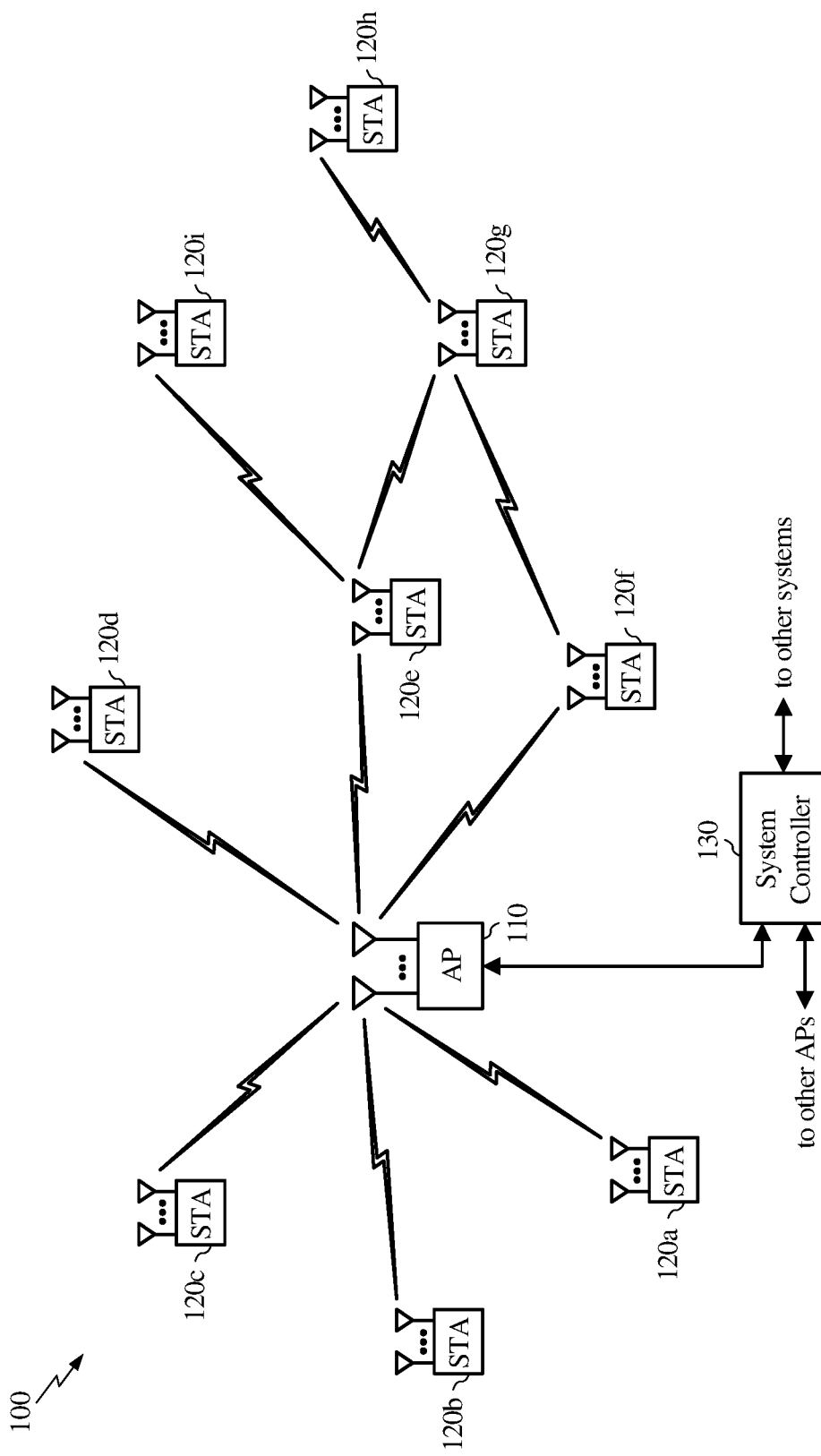
FIG. 1 shows a block diagram of an example wireless system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an Internet of things (IOT) network.

Existing RF sensing techniques characterize the presence and movement of objects in an environment based on changes in measured channel state information (CSI). CSI describes how signals propagate through a wireless channel between a transmitting device and a receiving device. The IEEE 802.11 standard provides a channel sounding procedure whereby by a transmitting (TX) device transmits a known pattern or sequence of signals, over a wireless channel, to a receiving (RX) device, which captures or acquires CSI based on the received signals. The RX device may compare the received signals with the known pattern or sequence to determine the effects of the wireless channel on the propagation of the signals. For example, the CSI may be a matrix representation of the wireless channel, where each entry in the matrix indicates a channel frequency response (CFR) associated with a respective tone or subcarrier of the wireless channel, between a respective transmit antenna of the TX device and a respective receive antenna of the RX device.

Aspects of the present disclosure recognize that CSI acquired from wireless communications in the millimeter-wave (mmW) frequency spectrum (including frequencies greater than or equal to 30 GHz) may not be suitable for RF sensing. For example, beamforming is often used for communications in the mmW spectrum to focus the energy of wireless signals in a narrow direction to compensate for path loss and achieve greater range. However, such beamformed signals can be blocked or reflected by a target object as well as other objects in the environment. The reflections by other objects in the environment may cause changes in the measured CSI unrelated to the presence or movement of the target object. As a result, the presence or movement of the target object may not be readily discernable from the CSI measured from wireless signals transmitted in the mmW spectrum.

On the other hand, aspects of the present disclosure recognize that the directionality of electromagnetic signals generated through beamforming (also referred to herein as "beamformed signals") may be well-suited for radar ranging applications. For example, a radar system may operate by transmitting and receiving electromagnetic pulses in the form of beamformed signals. Some of the pulses reflect off objects or surfaces along the transmission path, producing "echoes." The radar system may determine the distances of objects or surfaces in the vicinity based on a round trip time between the transmission of a pulse to the reception of an echo of that pulse. Accordingly, radar-based ranging techniques may be better suited (than CSI) for RF sensing in the mmW frequency spectrum.

Implementations of the subject matter described in this disclosure may be used for RF sensing in the mmW frequency spectrum. Some implementations more specifically relate to radar-based RF sensing techniques. In some aspects, radar-based RF sensing may be performed over multiple phases. During a session setup phase, a radar initiator identifies one or more wireless stations (STAs) that are capable of radar ranging and sets up a radar measurement session that includes at least one of the identified STAs. In some implementations, the radar initiator may establish a respective peer-to-peer (P2P) communication session with each STA participating in the radar measurement session (also referred to herein as a "radar STA"). During a measurement negotiation phase, the radar initiator performs a respective beamforming training operation with each radar STA and indicates, to each radar STA, one or more parameters associated with the radar measurement session. The beamforming training operation may be any operation that can be used to determine a line-of-sight (LOS) distance and direction of the radar STA (such as the first path beamforming training procedure defined by the IEEE 802.11az amendment of the IEEE 802.11 standard). The session parameters provided to each radar STA may include, for example, a timing of a radar ranging operation to be performed by the radar STA, a range of directions to be scanned by the radar ranging operation, or relative positions of other radar STAs.

During a radar measurement phase, the radar initiator transmits radar setup information to, and receives ranging information from, each radar STA. More specifically, the radar setup information may trigger a respective radar STA to perform a radar ranging operation that indicates a distance or a direction of an object in relation to the radar STA, and the ranging information may include the results of the radar ranging operation performed by the radar STA. For example, during the radar ranging operation, the radar STA may transmit radar pulses in a range of directions and measure a round-trip time (RTT) of resulting echoes. As described herein, the distances and directions of objects in the environment can be characterized by the RTT of echoes reflected by such objects. However, the ranging information provided by each radar STA may only indicate the distance and direction of an object in relation to that STA. In some aspects, the radar initiator may perform an object detection operation that indicates a location of an object associated with the ranging information received from each radar STA and the relative location (such as the distance and direction) of each radar STA. More specifically, the radar initiator may map the ranging information received from one or more radar STAs to a universal coordinate space associated with the environment.

Particular implementations of the subject matter described in this disclosure can be implemented to realize one or more of the following potential advantages. By leveraging radar ranging techniques, aspects of the present disclosure may enable RF sensing to be performed in the mmW frequency spectrum. As described herein, existing RF sensing techniques characterize the presence and movement of objects in an environment based on measured CSI. However, the accuracy of such CSI-based characterizations may be significantly impaired in the mmW spectrum due to beamforming in wireless signal transmissions. By contrast, beamforming may be well-suited for radar ranging applications. Unlike CSI, the RTT of a radar pulse and resulting echo can precisely indicate the distance and direction of a particular object in relation to the transmitting STA (unrelated to other objects that may be present in the environment). By combining ranging information from multiple radar STAs, aspects of the present disclosure may scan the environment for objects from different angles. For example, such information can be used to verify the location of objects in the LOS of multiple radar STAs as well as detect the presence and movement of objects that may be "hidden" from the LOS of one or more radar STAs.

Further, by leveraging wireless communication techniques defined by the IEEE 802.11 family of standards, aspects of the present disclosure may enable radar-based RF sensing to be implemented by existing wireless communication systems and networks. For example, an access point (AP) may perform the function of the radar initiator and one or more STAs may perform the functions of each radar transmitter/receiver. The radar initiator may use packet formats conforming to the IEEE 802.11 family of standards to communicate radar measurement parameters to each radar STA (such as a timing of a radar ranging operation to be performed by the radar STA, relative positions of other radar STAs, or a range of directions to be scanned by the radar STA). Each radar STA also may use such packet formats to report the results of their ranging operations to the radar initiator. Further, the radar-based RF sensing implementations of the present disclosure obey the link access rules defined by existing IEEE 802.11 standards, thereby enabling radar functionality in frequency bands commonly used for wireless communications.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, at least a subset of the STAs 120a-120i may form a personal basic service set (PBSS). For example, a PBSS may be formed by any number of peer STAs that support directional multi-gigabit (DMG) or enhanced DMG (EDMG) functionality (such as beamforming and EDCA based ranging). One of the STAs in the PBSS assumes the role of a PBSS control point (PCP), which provides various services related to establishing and maintaining the PBSS. Such services may include, among other examples, timing synchronization and link access coordination with other STAs associated with the PBSS. The PCP is also responsible for transmitting DMG beacon frames. Similar to the beacon frames transmitted by the AP 110, the DMG beacon frames may carry any information needed to associate, or maintain association, with the PBSS.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
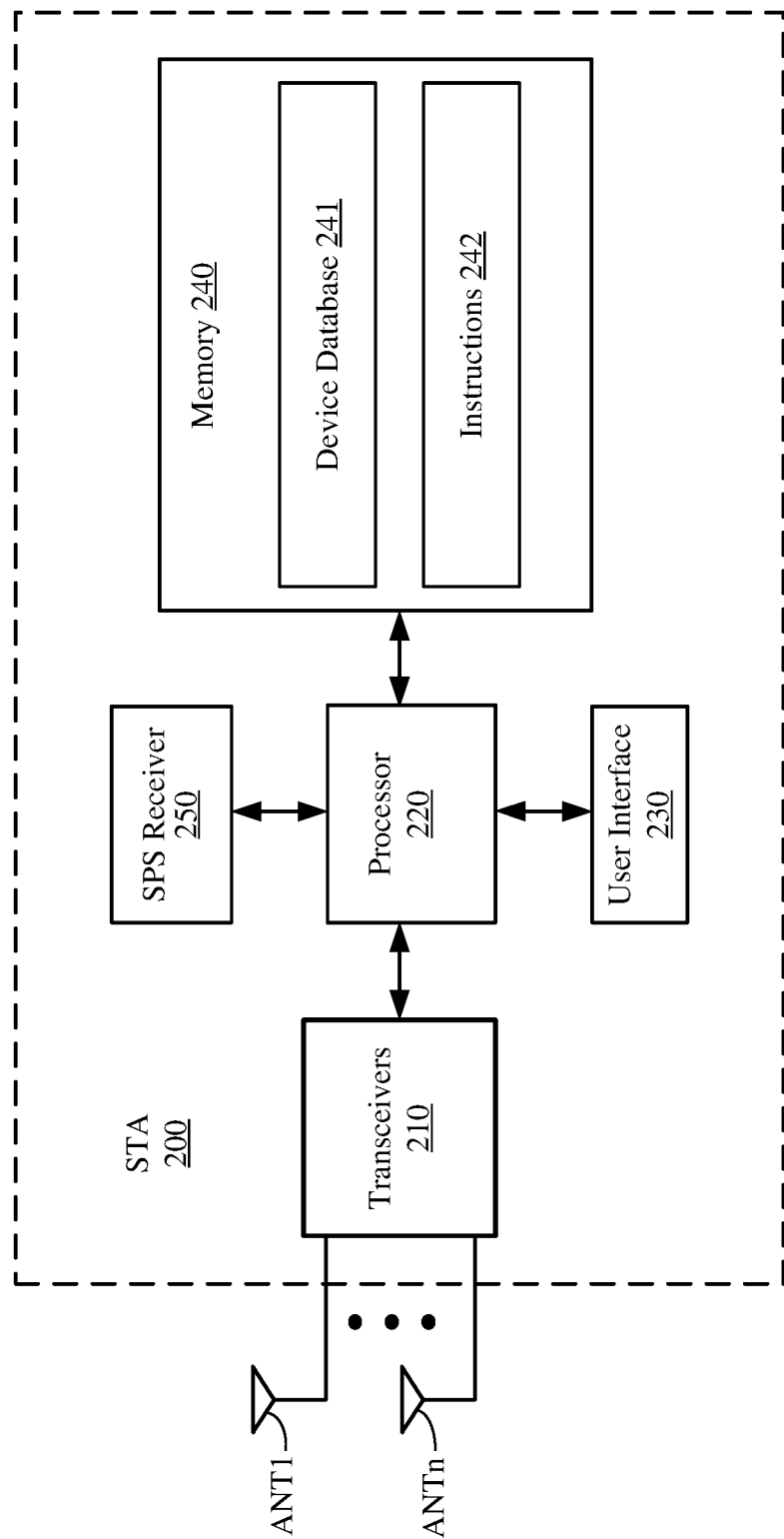
FIG. 2 shows a block diagram of an example wireless station (STA).

FIG. 2 shows an example wireless station (STA) 200. The STA 200 may be one implementation of at least one of the STAs 120a-120i of FIG. 1. In some implementations, the STA 200 may be, or perform the function of, a PCP (such as described with reference to FIG. 1). The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

In some implementations, the processor 220 may be a component of a processing system. A processing system may generally refer to a system or series of machines or components that receives inputs and processes the inputs to produce a set of outputs (which may be passed to other systems or components of, for example, the STA 200). For example, a processing system of the STA 200 may refer to a system including the various other components or subcomponents of the STA 200.

The processing system of the STA 200 may interface with other components of the STA 200, and may process information received from other components (such as inputs or signals), output information to other components, and the like. For example, a chip or modem of the STA 200 may be coupled to or include a processing system, a first interface to output information, and a second interface to obtain information. In some instances, the first interface may refer to an interface between the processing system of the chip or modem and a transmitter, such that the STA 200 may transmit information output from the chip or modem. In some instances, the second interface may refer to an interface between the processing system of the chip or modem and a receiver, such that the STA 200 may obtain information or signal inputs, and the information may be passed to the processing system. A person having ordinary skill in the art will readily recognize that the first interface also may obtain information or signal inputs, and the second interface also may output information or signal outputs.

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
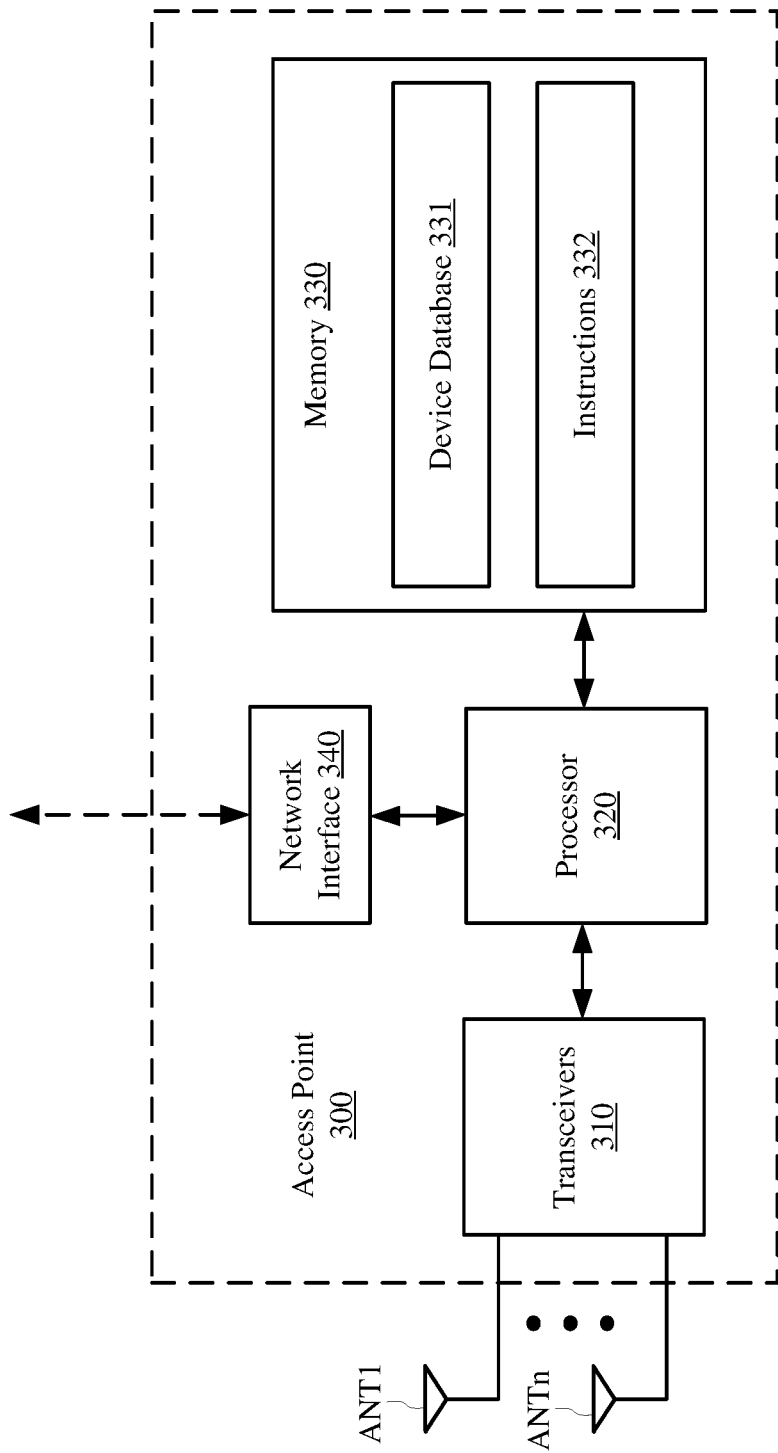
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

In high frequency (such as 60 GHz or millimeter wave (mmW)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The processor 320 may be any suitable one or more processors capable of executing scripts or instructions of one or more software programs stored in the AP 300 (such as within the memory 330). In some implementations, the processor 320 may be or include one or more microprocessors providing the processor functionality and external memory providing at least a portion of machine-readable media. In other implementations, the processor 320 may be or include an ASIC with the processor, the bus interface, the user interface, and at least a portion of the machine-readable media integrated into a single chip. In some other implementations, the processor 320 may be or include one or more FPGAs or PLDs. In some implementations, the processor 320 may be a component of a processing system. For example, a processing system of the AP 300 may refer to a system including the various other components or subcomponents of the AP 300.

The processing system of the AP 300 may interface with other components of the AP 300, and may process information received from other components (such as inputs or signals), output information to other components, and the like. For example, a chip or modem of the AP 300 may include a processing system, a first interface to output information, and a second interface to obtain information. In some instances, the first interface may refer to an interface between the processing system of the chip or modem and a transmitter, such that the AP 300 may transmit information output from the chip or modem. In some instances, the second interface may refer to an interface between the processing system of the chip or modem and a receiver, such that the AP 300 may obtain information or signal inputs, and the information may be passed to the processing system. A person having ordinary skill in the art will readily recognize that the first interface also may obtain information or signal inputs, and the second interface also may output information or signal outputs.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
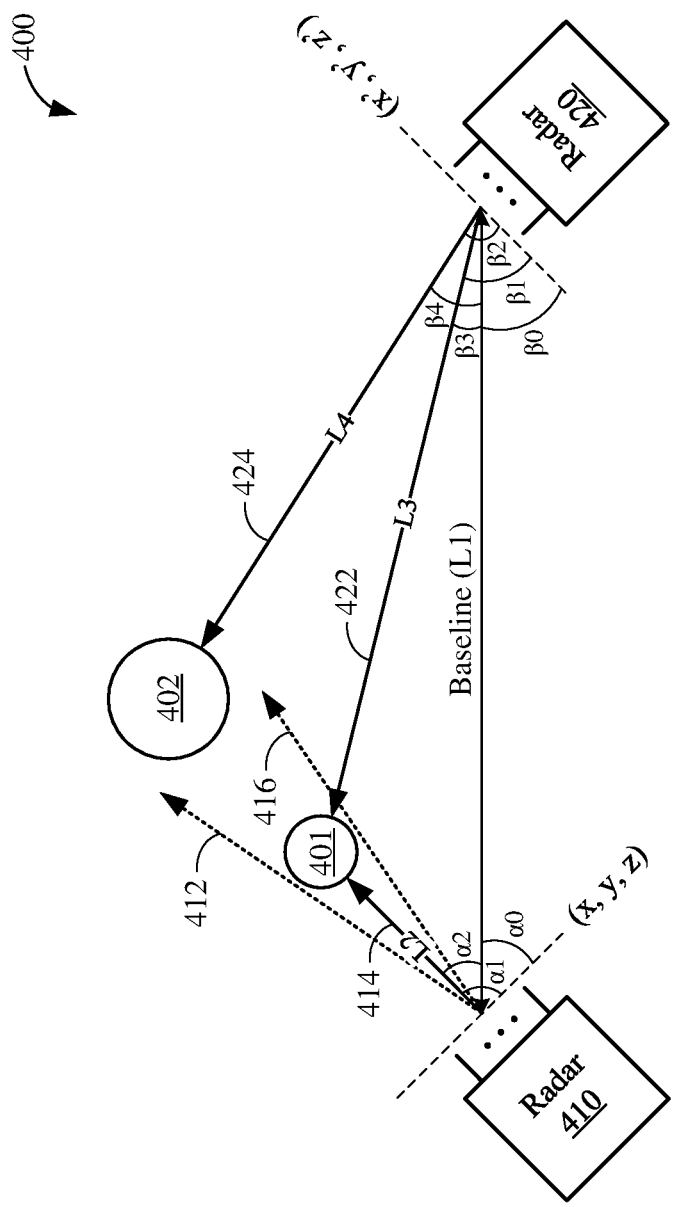
FIG. 4 shows an example radio frequency (RF) sensing environment.

FIG. 4 shows an example RF sensing environment 400. The example environment 400 is shown to include a first object 401, a second object 402, a first radar device 410, and a second radar device 420. As shown in FIG. 4, the radar devices 410 and 420 are spatially separated by a baseline distance (L1). In some implementations, each of the radar devices 410 and 420 may be one example of any of the STAs 120a-120i of FIG. 1 or the STA 200 of FIG. 2.

In the example of FIG. 4, the first radar device 410 may be capable of monostatic radar ranging. In other words, the first radar device 410 may perform a radar ranging operation by transmitting a series of radar pulses 412-416 in a number of directions. Each of the radar pulses 412-416 may be a beamformed RF signal having a particular width and directionality. Objects or surfaces along the trajectory of any of the radar pulses 412-416 may cause the respective pulses to reflect or scatter. Reflected pulses may be referred to as "echoes" of the pulses from which they originate. As shown in FIG. 4, the first object 401 is located along the path of the radar pulse 414. As such, the radar pulse 414 may be reflected back to the first radar device 410 as an echo (not shown for simplicity). In some implementations, the radar device 410 may determine, obtain calculate, or otherwise ascertain a distance (L2) of the object 401 based on a round-trip-time (RTT) or time-of-flight (ToF) of the radar pulse 414. For example, the RTT may be a duration from the time the radar pulse 414 is transmitted to the time the echo of the pulse 414 is received by the radar device 410. In some implementations, the radar device 410 may determine, obtain, calculate, or otherwise ascertain a direction (al) of the object 401 based on an angle of departure (AoD) of the radar pulse 414 or an angle of arrival (AoA) of the resulting echo.

Aspects of the present disclosure recognize that, due to the directionality of radar pulses, an object located in radar device's line-of-sight (LOS) may block or otherwise interfere with the detection of other objects located in the same LOS. For example, as shown in FIG. 4, the objects 401 and 402 are both located along the same LOS with respect to the first radar device 410. As a result, the first object 401 prevents any the radar pulses transmitted by the radar device 410 from reaching the second object 402. Thus, the first radar device 410 may be unable to detect the second object 402. By contrast, the objects 401 and 402 are located along different LOSs with respect to the second radar device 420. In the example of FIG. 4, the second radar device 420 also may be capable of monostatic radar ranging. As such, the second radar device 420 may detect the presence or movement of the objects 401 and 402 based on an RTT of radar pulses 422 and 424 transmitted in the directions of the objects 401 and 402, respectively. More specifically, the second radar device 420 may determine, obtain, calculate, or otherwise ascertain a relative distance (L3) and direction ($\beta 1$) of the first object 401 based on the radar pulse 422 (and resulting echo) and may determine, obtain, calculate, or otherwise ascertain a relative distance (L4) and direction ($\beta 2$) of the second object 402 based on the radar pulse 424 (and resulting echo).

In some aspects, a radar initiator may combine the results of the radar ranging operations performed by each of the radar devices 410 and 420 to detect the presence or movements of objects in the environment 400 (such as in accordance with an RF sensing application). In some implementations, the radar initiator may be (or include) one of the radar devices 410 or 420. In such implementations, the radar initiator may receive the results of a radar ranging operation performed by the other radar device and map the locations of objects in the environment 400 based on the received results. For example, if the first radar device 410 is the radar initiator, the second radar device 420 may report the results of its radar ranging operation (also referred to herein as "ranging information") to the first radar device 410. Such ranging information may indicate the distances L3 and L4 and directions $\beta 1$ and $\beta 2$ of the objects 401 and 402, respectively. However, as shown in FIG. 4, the radar devices 410 and 420 are spatially diverse, and the antennas of the first radar device 410 are positioned at different angles than the antennas of the second radar device 420. As such, the first radar device 410 may be associated with a coordinate space (x, y, z) that is different than a coordinate space (x', y', z') associated with the second radar device 420.

In some implementations, the first radar device 410 (as the radar initiator) may map the locations of the objects 401 and 402 to its own coordinate space (x, y, z). In such implementations, the first radar device 410 may determine, obtain, calculate, or otherwise ascertain a distance (L1) and direction ($\alpha 0$) of the second radar device 420 in relation to the first radar device 410 as well as the direction ($\beta 0$) of the first radar device 410 in relation to the second radar device 420. For example, the radar devices 410 and 420 may perform a beamforming training operation or exchange (such as the first path beamforming training procedure defined by the IEEE 802.11az amendment of the IEEE 802.11 standard) that indicates the LOS distance (L1) and directions ($\alpha 0$, $\beta 0$) between the radar devices 410 and 420. Accordingly, the first radar device 410 may convert the ranging information received from the second radar device 420 from the coordinate space (x', y', z') to the coordinate space (x, y, z) based on L1, $\alpha 0$, and $\beta 0$. In some other implementations, the radar initiator may be separate from the radar devices 410 and 420. In such implementations, the radar initiator (not shown for simplicity) may receive respective ranging information from each of the radar receivers 410 and 420 and map the locations of the objects 401 and 402 to a universal coordinate space based on the received ranging information.

Figure 5:
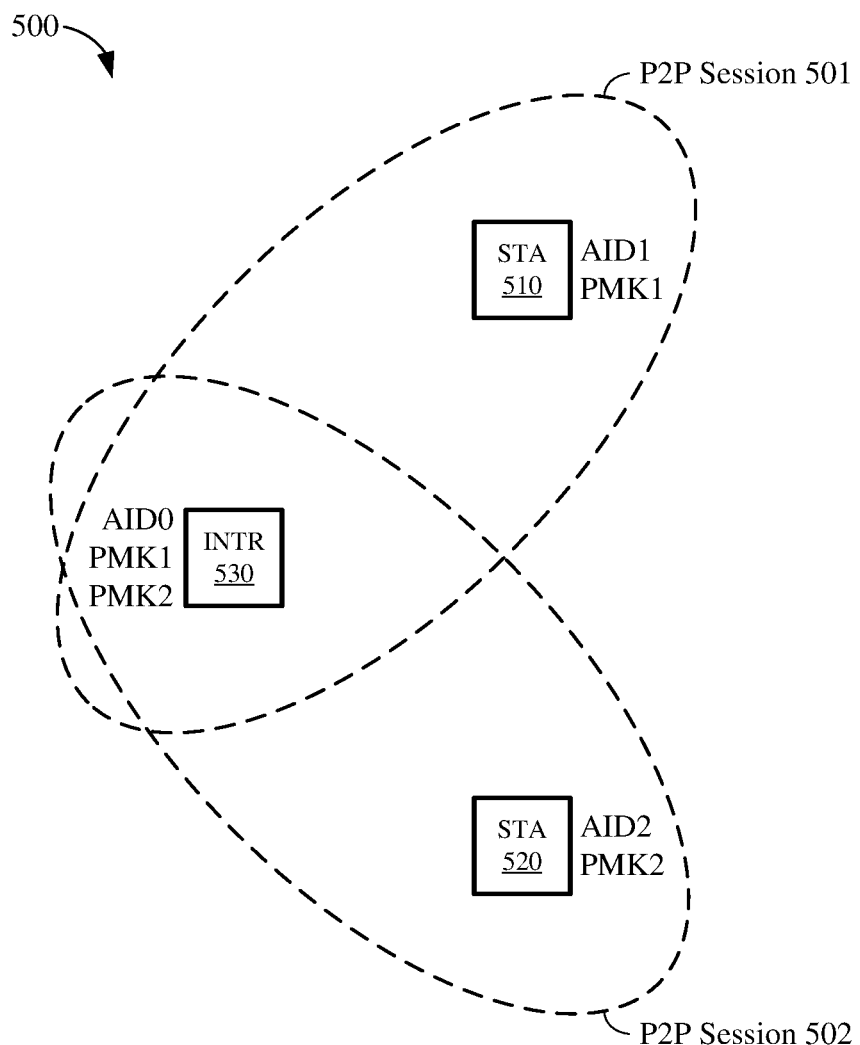
FIG. 5 shows an example radar system.

FIG. 5 shows an example radar system 500. The radar system 500 includes a first STA 510, a second STA 520, and a radar initiator (INTR) 530. In some implementations, the radar initiator 530 may be one example of any of the APs 110 or 300 of FIGS. 1 and 3, respectively. In some implementations, each of the STAs 510 and 520 may be one example of any of the STAs 120a-120i of FIG. 1 or the STA 200 of FIG. 2. More specifically, each of the STAs 510 and 520 may be a radar STA capable of performing radar ranging operations. As such, the STAs 510 and 520 may be examples of the radar devices 410 and 420, respectively, of FIG. 4. Although two STAs 510 and 520 are shown in the example of FIG. 5, the radar system 500 may include fewer or more STAs in some other implementations.

In the example of FIG. 5, the radar system 500 may be configured to perform a session setup phase of a radar-based RF sensing operation. During the session setup phase, the radar initiator 530 may determine, receive, or otherwise obtain an indication of the radar capabilities of the STAs 510 and 520 and may set up a radar measurement session that includes each of the STAs 510 and 520. For example, the radar initiator 530 may establish a first P2P communication session 501 with the first STA 510 and may establish a second P2P communication session 502 with the second STA 520. In some implementations, the first P2P session 501 may be identified by an AID value (AID0) of the radar initiator 530 and an AID value (AID1) assigned to the first STA 510. In some other implementations, the first P2P session 501 may be identified by AID0 and an unassociated identifier (UID) value assigned to the first STA 510 (such as when the first STA 510 is not associated with the radar initiator 530). In some implementations, the second P2P session 502 may be identified by AID0 and an AID value (AID2) assigned to the second STA 520. In some other implementations, the second P2P session 502 may be identified by AID0 and a UID value assigned to the second STA 520 (such as when the second STA 520 is not associated with the radar initiator 530).

During the first P2P session 501, the first STA 510 exchanges its capabilities with the radar initiator 530. More specifically, the radar initiator 530 may determine, receive, or otherwise obtain an indication of whether the first STA is capable of performing radar ranging operations (such as described with reference to FIG. 4). In some implementations, the radar initiator 530 and the first STA 510 also may negotiate a shared pairwise master key (PMK) that is unique to the first P2P session 501 (PMK1). For example, the PMK may be associated with a secure authentication mechanism defined by existing versions of the IEEE 802.11 standard. More specifically, the PMK can be used to generate a pairwise temporal key (PTK), and corresponding temporal keys (TKs), for encrypting and decrypting communications between a pair of devices. During the second P2P session 502, the second STA 520 exchanges its capabilities with the radar initiator 530. More specifically, the radar initiator 530 may determine, receive, or otherwise obtain an indication of whether the second STA is capable of performing radar ranging operations (such as described with reference to FIG. 4). In some implementations, the radar initiator 530 and the second STA 520 also may negotiate a shared PMK that is unique to the second P2P session 502 (PMK2).

In the example of FIG. 5, the radar initiator 530 may determine or ascertain that each of the STAs 510 and 520 is capable of performing radar ranging operations. As such, the radar initiator 530 may select each of the STAs 510 and 520 to perform in the radar measurement session. In some implementations, the radar initiator 530 and the first STA 510 may retain the same PMK (PMK1) for the duration of the radar measurement session. In other words, PMK1 may be used for secure communications between the radar initiator 530 and the first STA 510 for the duration of the radar measurement session. In some implementations, the radar initiator 530 and the second STA 520 may retain the same PMK (PMK2) for the duration of the radar measurement session. In other words, PMK2 may be used for secure communications between the radar initiator 530 and the second STA 520 for the duration of the radar measurement session.

Figure 6:
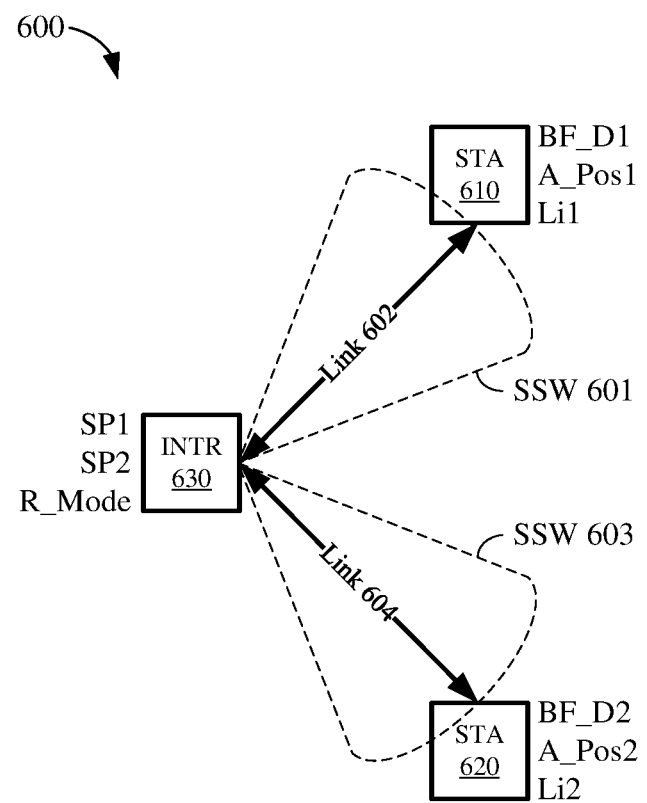
FIG. 6 shows an example radar system.

FIG. 6 shows an example radar system 600. The radar system 600 includes a first STA 610, a second STA 620, and a radar initiator (INTR) 630. In some implementations, the radar initiator 630 may be one example of the radar initiator 530 of FIG. 5. In some implementations, the STAs 610 and 620 may be examples of the STAs 510 and 520, respectively, of FIG. 5. More specifically, each of the STAs 610 and 620 may be a radar STA capable of performing radar ranging operations. As such, the STAs 610 and 620 may be examples of the radar devices 410 and 420, respectively, of FIG. 4. Although two STAs 610 and 620 are shown in the example of FIG. 6, the radar system 600 may include fewer or more STAs in some other implementations.

In the example of FIG. 6, the radar system 600 may be configured to perform a measurement negotiation phase of a radar-based RF sensing operation. During the measurement negotiation phase, the radar initiator 530 may establish beam links 602 and 604 with the STAs 610 and 620, respectively. In some implementations, the beam links 602 and 604 may be used for subsequent communications between the radar initiator 630 and the STAs 610 and 620. In addition, the radar initiator 630 may determine, obtain, calculate, or otherwise ascertain a respective distance (such as a baseline distance) to each of the STAs 610 and 620. As described with reference to FIG. 4, the baseline distances may be used by the radar initiator 630 to map the locations of objects to a universal coordinate space (such as in accordance with an RF sensing application). In some implementations, the radar initiator 630 may establish the beam links 602 and 604 by performing beamforming training operations (such as the first path beamforming training procedure defined by the IEEE 802.11az amendment of the IEEE 802.11 standard) with the STAs 610 and 620, respectively.

The radar initiator 630 may establish the beam link 602 with the first STA 610 by performing a first sector sweep (SSW) 601. During the first sector sweep 601, the radar initiator 630 and the first STA 610 may exchange beamforming frames that can be used to tune their antennas or configure antenna weight vectors (AWVs) for the transmission and reception of beamformed signals. More specifically, through the exchange of beamforming frames, the radar initiator 630 may determine, obtain, calculate, or otherwise ascertain a beamforming direction (BF_D1) associated with the first STA 610 and a relative position of the STA's antennas (A_Pos1). The radar initiator 630 also may determine, obtain, calculate, or otherwise ascertain its distance (Li1) from the first STA 610 based on an RTT of the beamforming frames. In some implementations, the radar initiator 630 may communicate a set of parameters (SP1) associated with the radar measurement session to the first STA 610. For example, the session parameters SP1 may be carried in one or more beamforming frames exchanged during (or after) the establishment of the beam link 602. Example session parameters SP1 may include a measurement setup identifier (ID) associated with a radar measurement session, a timing of radar ranging operations to be performed by the first STA 610, a range of directions to be scanned by the radar ranging operations, or information identifying other radar STAs (such as the STA 620) participating in the radar measurement session, among other examples.

The radar initiator 630 may establish the beam link 604 with the second STA 620 by performing a second sector sweep 603. During the second sector sweep 603, the radar initiator 630 and the second STA 620 may exchange beamforming frames that can be used to tune their antennas or configure AWVs for the transmission and reception of beamformed signals. More specifically, through the exchange of beamforming frames, the radar initiator 630 may determine, obtain, calculate, or otherwise ascertain a beamforming direction (BF_D2) associated with the second STA 620 and a relative position of the STA's antennas (A_Pos2). The radar initiator 630 also may determine, obtain, calculate, or otherwise ascertain its distance (Li2) from the second STA 620 based on an RTT of the beamforming frames. In some implementations, the radar initiator 630 may communicate a set of parameters (SP2) associated with the radar measurement session to the second STA 610. For example, the session parameters SP2 may be carried in one or more beamforming frames exchanged during (or after) the establishment of the beam link 604. Example session parameters may include the measurement setup ID associated with the radar measurement session, a timing of radar ranging operations to be performed by the second STA 620, a range of directions to be scanned by the radar ranging operations, or information identifying other radar STAs (such as the STA 610) participating in the radar measurement session.

In some aspects, the radar initiator 630 may indicate, to each of the STAs 610 and 620, a radar mode (R_Mode) associated with the radar measurement session. Example radar modes may include at least a periodic scanning mode and an object tracking mode. In the periodic scanning mode, each of the STAs 610 and 620 independently performs a radar ranging operation that scans an environment for one or more objects. As such, the STAs 610 and 620 may perform the scans concurrently or at different times. In some implementations, each of the STAs 610 and 620 may be configured to scan all directions of the environment. In some other implementations, one or more of the STAs 610 or 620 may be configured to scan only a subset of directions. For example, the radar initiator 630 may indicate the range of directions to be scanned in the session parameters SP1 or SP2 provided to the STAs 610 and 620, respectively. In the object tracking mode, the STAs 610 and 620 track the same "target" object in an environment at different times. For example, the first STA 610 may perform a radar ranging operation that indicates a relative position of a target object at a first time and the second STA 620 may perform a radar ranging operation that indicates a relative position of the target object at a second time (following the first time).

Aspects of the present disclosure recognize that the locations of objects may change over time (as the objects move through the environment). If too much time elapses between the radar ranging operation performed by the first STA 610 and the radar ranging operation performed by the second STA 620, the second STA 620 may lose track of the target object. With reference for example to FIG. 4, the first object 401 may be a target object that is initially tracked by the first radar device 410 and subsequently tracked by the second radar device 420. However, if too much time elapses between the radar ranging operations performed by the radar devices 410 and 420, the second radar device 420 may be unable to discern whether the target object 401 is still in the same location (L3, β1) or has moved to the location of the second object 402 (L4, β2). Thus, to ensure accurate object tracking, aspects of the present disclosure may limit (or minimize) the duration between the radar ranging operation performed by the first radar device 410 (or the first STA 610) and the radar ranging operation performed by the second radar device 420 (or the second STA 620).

In some implementations, the radar STA that performs the initial radar ranging operation may report radar ranging information to the radar STA that performs a subsequent radar ranging operation so that the subsequent radar ranging operation can scan only a narrow range of directions associated with the last-known location of the target object. However, as described with reference to FIG. 4, the STAs 610 and 620 may be associated with different coordinated spaces. As such, at least one of the STAs 610 or 620 may need to perform a coordinate conversion operation to convert the results of the ranging operation performed by one of the STA 610 or 620 to the coordinate space associated with the other STA. In some implementations, the radar initiator 630 may calculate a distance and direction of the second STA 620 relative to the first STA 610 and may include the distance and direction of the second STA 620 in the session parameters SP1 reported to the first STA 610. In such implementations, the coordinate conversion may be performed by the first STA 610. In some other implementations, the radar initiator 630 may calculate a distance and direction of the first STA 610 relative to the second STA 620 and may include the distance and direction of the first STA 610 in the session parameters SP2 reported to the second STA 620. In such implementations, the coordinate conversion may be performed by the second STA 620.

With reference for example to FIG. 4, the first radar device 410 may report a relative location of the target object 401 to the second radar device 420. As shown in FIG. 4, the target object 401 is positioned in a first direction α1 relative to the first radar device 410 and a second direction β1 relative to the second radar device 420. The second direction β1 can be described in terms of the baseline distance L1 between the radar devices 410 and 420, a direction (α2) of the target object 401 relative to L1, a direction ((33) of the target object 401 relative to L1, and the direction (30 of the first radar device 410 to the second radar device 420:

$$\beta 3 = \sin^{-1}\left(\frac{L2*\sin(\alpha 2)}{\left[L1^2 + L2^2 - 2*L1*L2*\cos(\alpha 2)\right]^{-\frac{1}{2}}}\right)$$

$$\beta 1 = \beta 3 + \beta 0$$

In some implementations, the first radar device 410 may perform a coordinate conversion operation that converts the first direction α1 to the second direction β1. In such implementations, the first radar device 410 may report the second direction β1 to the second radar device 420. In some other implementations, the first radar device 410 may report the first direction α1 to the second radar device 410. In such implementations, the second radar device 420 may perform a coordinate conversion operation that converts the first direction α1 to the second direction β1. Thus, upon receiving the ranging information from the first radar device 410, the second radar device 420 may scan only a narrow range of directions, around β1, for the target object 401 (rather than scanning all directions, which consumes significant time and may result in the detection of other objects that can be conflated with the target object 401).

Figure 7:
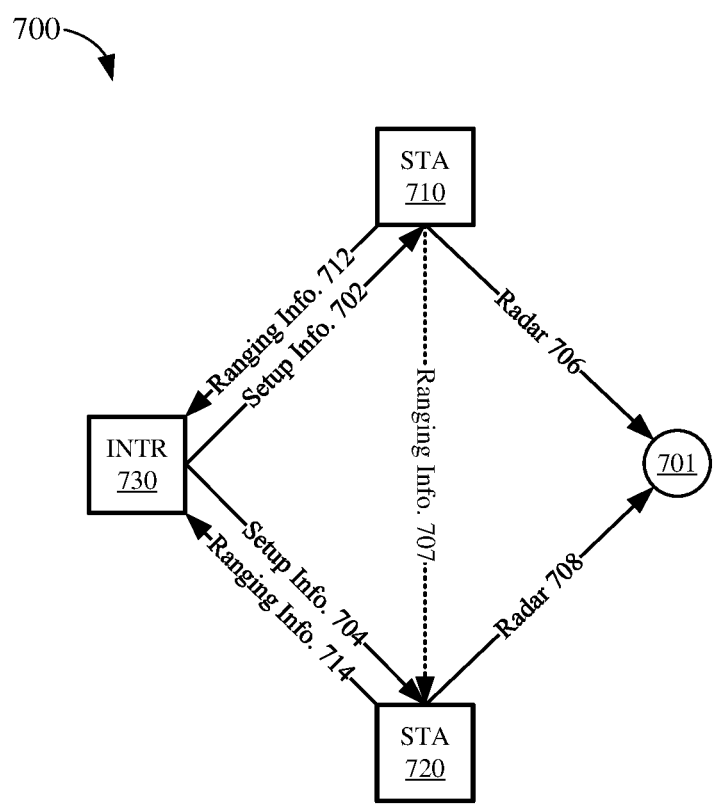
FIG. 7 shows an example radar system.

FIG. 7 shows an example radar system 700. The radar system 700 includes a first STA 710, a second STA 720, and a radar initiator (INTR) 730. In some implementations, the radar initiator 730 may be one example of the radar initiator 630 of FIG. 6. In some implementations, the STAs 710 and 720 may be examples of the STAs 610 and 620, respectively, of FIG. 6. More specifically, each of the STAs 710 and 720 may be a radar STA capable of performing radar ranging operations. As such, the STAs 710 and 720 may be examples of the radar devices 410 and 420, respectively, of FIG. 4. Although two STAs 710 and 720 are shown in the example of FIG. 7, the radar system 700 may include fewer or more STAs in some other implementations.

In the example of FIG. 7, the radar system 700 may be configured to perform a radar measurement phase of a radar-based RF sensing operation. During the radar measurement phase, the radar initiator 730 may trigger each of the STAs 710 and 720 to perform a respective radar ranging operation. In some aspects, the radar initiator 730 may transmit radar setup information 702 and 704 to the STAs 710 and 720, respectively. The radar setup information 702 and 704 may include at least a measurement setup ID associated with a radar measurement session and a measurement instance ID associated with a particular instance of the radar measurement session (also referred to herein as a "measurement instance"). For example, the radar initiator 730 may perform multiple instances of a given radar measurement session by triggering one or more of the STAs to perform respective radar ranging operations during each measurement instance. As such, the measurement instance ID allows the radar initiator 730 and the STAs 710 and 720 to identify P2P communications by a particular measurement instance. In some implementations, the radar setup information 702 may be carried a packet transmitted, using beamforming, in the direction of the first STA 710 and the radar setup information 704 may be carried in a packet transmitted, using beamforming, in the direction of the second STA 720.

The first STA 710 is configured to perform a first radar ranging operation in response to the radar setup information 702 and report ranging information 712 back to the radar initiator 730. As described with reference to FIG. 4, the first STA 710 may perform the first radar ranging operation by transmitting radar pulses in a number of directions and listening for resulting echoes. In some implementations, the first STA 710 may be configured to scan all directions of the environment. In some other implementations, the first STA 710 may scan only a subset of directions (such as indicated by the radar initiator 730 during the measurement negotiation phase). The ranging information 712 may include the results of the first radar ranging operation and the current measurement instance ID. In some implementations, the ranging information 712 may indicate a distance, direction (azimuth and elevation), or velocity (Doppler shift) of an object 701 in the environment relative to the first STA 710. As described with reference to FIG. 4, the first STA 710 may determine, obtain, calculate, or otherwise ascertain the distance and direction of the object 701 based on an RTT and angle (such as an AoA or AoD) of a radar pulse 706 and resulting echo (not shown for simplicity) reflected by the object 701. In some implementations, the first STA 710 also may determine, obtain, calculate, or otherwise ascertain a velocity of the object 701 based on Doppler shifts detected across multiple radar pulses.

The second STA 720 is configured to perform a second radar ranging operation in response to the radar setup information 704 and report ranging information 714 back to the radar initiator 730. As described with reference to FIG. 4, the second STA 720 may perform the second radar ranging operation by transmitting radar pulses in a number of directions and listening for resulting echoes. In some implementations, the second STA 720 may be configured to scan all directions of the environment. In some other implementations, the second STA 720 may scan only a subset of directions (such as indicated by the radar initiator 730 during the measurement negotiation phase). The ranging information 714 may include the results of the second radar ranging operation and the current measurement instance ID. In some implementations, the ranging information 714 may indicate a distance, direction (azimuth and elevation), or velocity (Doppler shift) of the object 701 relative to the second STA 770. As described with reference to FIG. 4, the second STA 720 may determine, obtain, calculate, or otherwise ascertain the distance and direction of the object 701 based on an RTT and angle (such as an AoA or AoD) of a radar pulse 708 and resulting echo (not shown for simplicity) reflected by the object 701. In some implementations, the second STA 720 also may determine, obtain, calculate, or otherwise ascertain a velocity of the object 701 based on Doppler shifts detected across multiple radar pulses.

In some aspects, the STAs 710 and 720 may perform their respective radar ranging operations in accordance with a radar mode associated with the radar measurement session (as indicated by the radar initiator 730 during the measurement negotiation phase). As described with reference to FIG. 6, the radar mode may be a periodic scanning mode or an object tracking mode. When operating in the periodic scanning mode, each of the STAs 710 and 720 may independently scan the environment for one or more objects. As such, the STAs 710 and 720 may perform their radar ranging operations concurrently or at different times and may report ranging information 712 and 714 associated with the same or different objects. When operating in the object tracking mode, the STAs 710 and 720 may coordinate their radar ranging operations to track the same target object. As such, the STAs 710 and 720 may perform their radar ranging operations at different times but report ranging information 712 and 714 associated with the same object. In some aspects, the radar initiator 730 may indicate an order of the ranging operations in the radar setup information 702 and 704. For example, each set of radar setup information 702 and 704 may identify which of the STAs 710 or 720 is to perform its radar ranging operation first and which of the STAs 710 or 720 is to perform its radar ranging operation second.

In some implementations, at least one of the STAs 710 or 720 may further provide a result of its ranging operation to the other STA. As described with reference to FIG. 6, when operating in the object tracking mode, the STA that performs an initial scan of the environment may provide its ranging information to the STA that performs a subsequent scan so that the subsequent scan can be more narrowly focused in a direction associated with the last-known location of the target object. In the example of FIG. 7, the first STA 710 may perform an initial scan of the environment to detect the target object 701 and the second STA 720 may perform a subsequent scan to continue tracking the target object 701. As such, the first STA 710 may provide ranging information 707 to the second STA 720 after performing the first radar ranging operation and prior to the second STA 720 performing the second radar ranging operation. In some implementations, the ranging information 707 may indicate the distance and direction of the target object 701 relative to the second STA 720. In such implementations, the first STA 710 may convert the results of the first radar ranging operation to a coordinate space associated with the second STA 720. In some other implementations, the ranging information 707 may indicate the distance and direction of the target object 701 relative to the first STA 710. In such implementations, the second STA 720 may convert the received ranging information 707 to its own coordinate space.

In some aspects, the radar initiator 730 may determine, obtain, calculate, or otherwise ascertain the location of the object 701 based on the ranging information 712 and 714 received from the STAs 710 and 720, respectively. More specifically, the radar initiator 730 may detect the presence or movement of the object 701 in accordance with an RF sensing application. In some implementations, the radar initiator 730 may map the location of the object 701 to a universal coordinate space based on the relative distance and direction of the object 701 to the first STA 710 (as indicated by the ranging information 712) and the relative distance and direction of the object 701 to the second STA 720 (as indicated by the ranging information 714). With reference for example to FIG. 6, the mapping may be performed based on the distance (Li1), direction (BF_D1), and antenna position (A_Pos1) of the first STA 710 and the distance (Li2), direction (BF_D2), and antenna position (A_Pos2) of the second STA 720 determined or obtained during the measurement negotiation phase. In some other aspects, the radar initiator 730 may communicate the received ranging information 712 and 714 to another device that is configured to perform the mapping (or other RF sensing functions).

Figure 8:
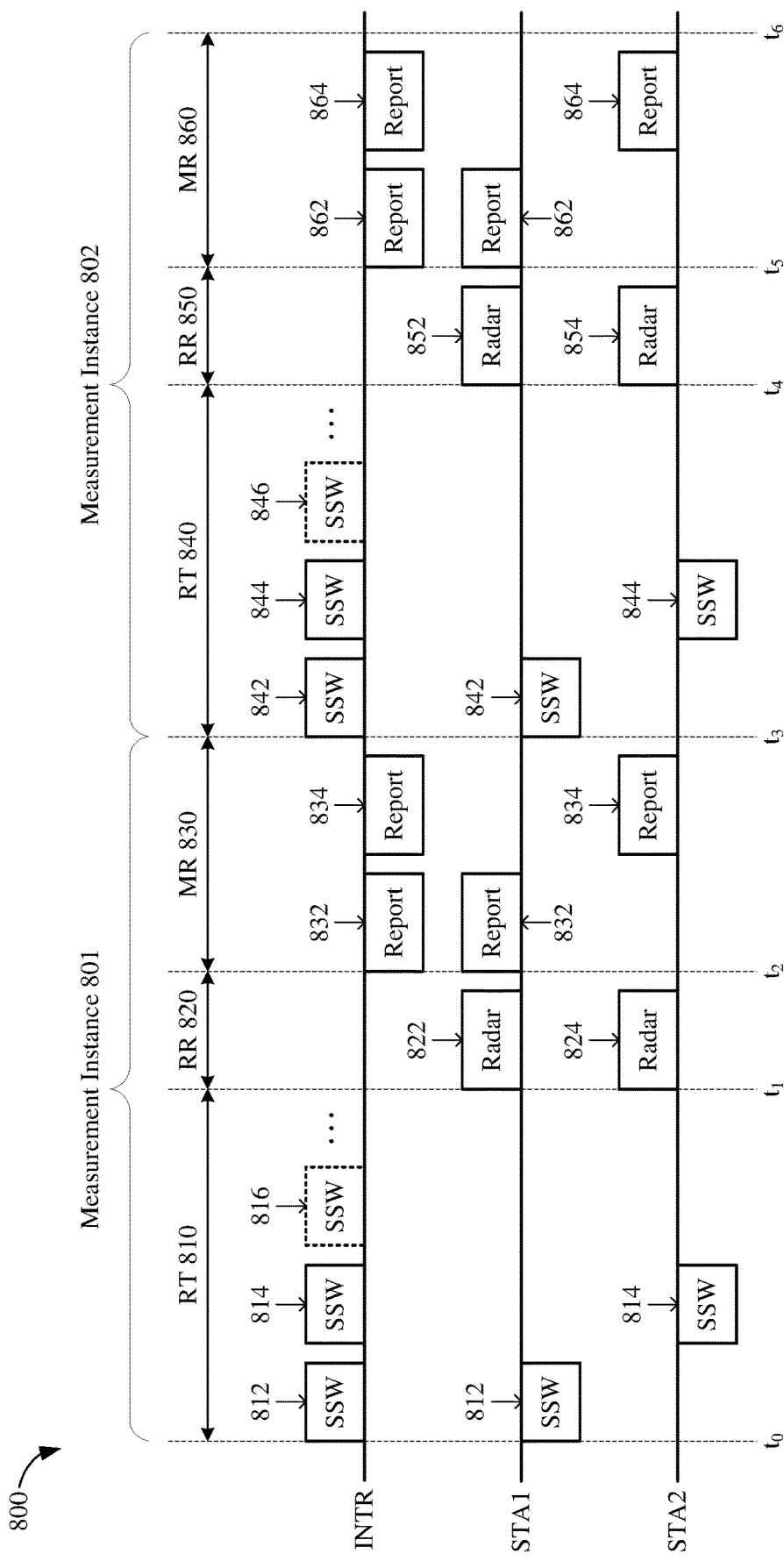
FIG. 8 shows a timing diagram depicting an example radar measurement phase of a radar measurement session.

FIG. 8 shows a timing diagram 800 depicting an example radar measurement phase of a radar measurement session. The radar measurement session may be performed by a radar initiator (INTR) and a number of wireless stations STA1 and STA2. In some implementations, the radar initiator and the wireless stations STA1 and STA2 may belong to a radar system, such as the radar system 700 of FIG. 7. Thus, the radar initiator may be one example of the radar initiator 730 and the wireless stations STA1 and STA2 may be examples of the STAs 710 and 720, respectively, of FIG. 7.

The timing diagram 800 shows two instances 801 and 802 of the radar measurement session. The first measurement instance 801 occurs from times $t_0$ to $t_3$ and the second measurement instance 802 occurs from times $t_3$ to $t_6$. Each of the measurement instances 801 and 802 can further be subdivided into a number of phases. For example, the first measurement instance 801 may include a radar triggering (RT) phase 810, from times $t_0$ to $t_1$, a radar ranging (RR) phase 820, from times $t_1$ to $t_2$, and a measurement reporting (MR) phase 830, from times $t_2$ to $t_3$. Similarly, the second measurement instance 802 may include an RT phase 840, from times $t_3$ to $t_4$, an RR phase 850, from times $t_4$ to $t_5$, and an MR phase 860, from times $t_5$ to $t_6$. In the example of FIG. 8, the second measurement instance 802 is shown to occur immediately after the first measurement instance 801. However, in some other implementations, the measurement instances 801 and 802 may be separated by some duration of time. Similarly, any of the adjacent phases 810-860 may be further separated by a given duration of time.

During the RT phase 810, the radar initiator transmits SSW frames 812 and 814 to STA1 and STA2, respectively. More specifically, the SSW frame 812 may be transmitted, using beamforming, in the direction of STA1 and the SSW frame 814 may be transmitted, using beamforming, in the direction of STA2. Accordingly, the wireless stations STA1 and STA2 may tune their antennas in the direction of the radar initiator, from times $t_0$ to $t_1$, to receive the SSW frames 812 and 814, respectively, from the radar initiator. In some implementations, each of the SSW frames 812 and 814 may carry radar setup information indicating at least a measurement setup ID associated with the radar measurement session and a measurement instance ID associated with the measurement instance 801. With reference for example to FIG. 7, the SSW frame 812 may carry the radar setup information 702 and the SSW frame 814 may carry the radar setup information 704. In some implementations, each of the SSW frames 812 and 814 may further indicate an order in which the wireless stations STA1 and STA2 are to perform respective radar ranging operations. In some implementations, the radar initiator may transmit a number of additional SSW frames 816, prior to the start of the RR phase 820, to prevent other wireless devices in the vicinity from interfering with ranging operations performed by the wireless stations STA1 and STA2.

During the RR phase 820, each of the wireless stations STA1 and STA2 performs a respective ranging operation in accordance with a radar mode associated with the radar measurement session. In the example of FIG. 8, the radar measurement session is associated with the periodic scanning mode. Accordingly, each of the wireless stations STA1 and STA2 may independently scan the environment for one or more objects. For example, STA1 may perform a first radar ranging operation by transmitting a number of radar pulses 822 in various directions and listening for resulting echoes (not shown for simplicity). Similarly, STA2 may perform a second radar ranging operation by transmitting a number of radar pulses 824 in various directions and listening for resulting echoes (not shown for simplicity). In the example of FIG. 8, the wireless stations STA1 and STA2 are shown to transmit the radar pulses 822 and 824 concurrently, at time $t_1$. However, in some other implementations, the wireless stations STA1 and STA2 may transmit the radar pulses 822 and 824 at different times. In some implementations, each of the wireless stations STA1 and STA2 may transmit its radar pulses 822 and 824, respectively, in all directions of the environment. In some other implementations, at least one of the wireless stations STA1 or STA2 may transmit its radar pulses 822 and 824, respectively, in a subset of directions (such as indicated by the radar initiator during the measurement negotiation phase).

During the MR phase 830, the wireless stations STA1 and STA2 transmit radar report frames 832 and 834, respectively, to the radar initiator. In some implementations, each of the radar report frames 832 and 834 may be transmitted, using beamforming, in the direction of the radar initiator. Each of the radar report frames 832 and 834 may include the measurement instance ID associated with the measurement instance 801. In some implementations, the radar report frame 832 may further carry ranging information indicating a result of the radar ranging operation performed, during the RR phase 820, by STA1. For example, such ranging information may indicate a distance, direction, or velocity of one or more objects in the environment relative to STA1. In some implementations, the radar report frame 834 may further carry ranging information indicating a result of the radar ranging operation performed, during the RR phase 820, by STA2. For example, such ranging information may indicate a distance, direction, or velocity of one or more objects in the environment relative to STA2. With reference for example to FIG. 7, the radar report frame 832 may carry the ranging information 712 and the radar report frame 834 may carry the ranging information 714.

During the RT phase 840, the radar initiator transmits SSW frames 842 and 844 to STA1 and STA2, respectively. More specifically, the SSW frame 842 may be transmitted, using beamforming, in the direction of STA1 and the SSW frame 844 may be transmitted, using beamforming, in the direction of STA2. Accordingly, the wireless stations STA1 and STA2 may tune their antennas in the direction of the radar initiator, from times $t_3$ to $t_4$, to receive the SSW frames 842 and 844, respectively, from the radar initiator. In some implementations, each of the SSW frames 842 and 844 may carry radar setup information indicating at least a measurement setup ID associated with the radar measurement session and a measurement instance ID associated with the measurement instance 802. With reference for example to FIG. 7, the SSW frame 842 may carry the radar setup information 702 and the SSW frame 844 may carry the radar setup information 704. In some implementations, each of the SSW frames 842 and 844 may further indicate an order in which the wireless stations STA1 and STA2 are to perform respective radar ranging operations. In some implementations, the radar initiator may transmit a number of additional SSW frames 846, prior to the start of the RR phase 850, to prevent other wireless devices in the vicinity from interfering with ranging operations performed by the wireless stations STA1 and STA2.

During the RR phase 850, each of the wireless stations STA1 and STA2 performs a respective ranging operation in accordance with a radar mode associated with the radar measurement session. In the example of FIG. 8, the radar measurement session is associated with the periodic scanning mode. Accordingly, each of the wireless stations STA1 and STA2 may independently scan the environment for one or more objects. For example, STA1 may perform a first radar ranging operation by transmitting a number of radar pulses 852 in various directions and listening for resulting echoes (not shown for simplicity). Similarly, STA2 may perform a second radar ranging operation by transmitting a number of radar pulses 854 in various directions and listening for resulting echoes (not shown for simplicity). In the example of FIG. 8, the wireless stations STA1 and STA2 are shown to transmit the radar pulses 852 and 854 concurrently, at time $t_4$. However, in some other implementations, the wireless stations STA1 and STA2 may transmit the radar pulses 852 and 854 at different times. In some implementations, each of the wireless stations STA1 and STA2 may transmit its radar pulses 852 and 854, respectively, in all directions of the environment. In some other implementations, at least one of the wireless stations STA1 or STA2 may transmit its radar pulses 852 and 854, respectively, in a subset of directions (such as indicated by the radar initiator during the measurement negotiation phase).

During the MR phase 860, the wireless stations STA1 and STA2 transmit radar report frames 862 and 864, respectively, to the radar initiator. In some implementations, each of the radar report frames 862 and 864 may be transmitted, using beamforming, in the direction of the radar initiator. Each of the radar report frames 862 and 864 may include the measurement instance ID associated with the measurement instance 802. In some implementations, the radar report frame 862 may further carry ranging information indicating a result of the radar ranging operation performed, during the RR phase 850, by STA1. For example, such ranging information may indicate a distance, direction, or velocity of one or more objects in the environment relative to STA1. In some implementations, the radar report frame 864 may further carry ranging information indicating a result of the radar ranging operation performed, during the RR phase 850, by STA2. For example, such ranging information may indicate a distance, direction, or velocity of one or more objects in the environment relative to STA2. With reference for example to FIG. 7, the radar report frame 862 may carry the ranging information 712 and the radar report frame 864 may carry the ranging information 714.

Figure 9:
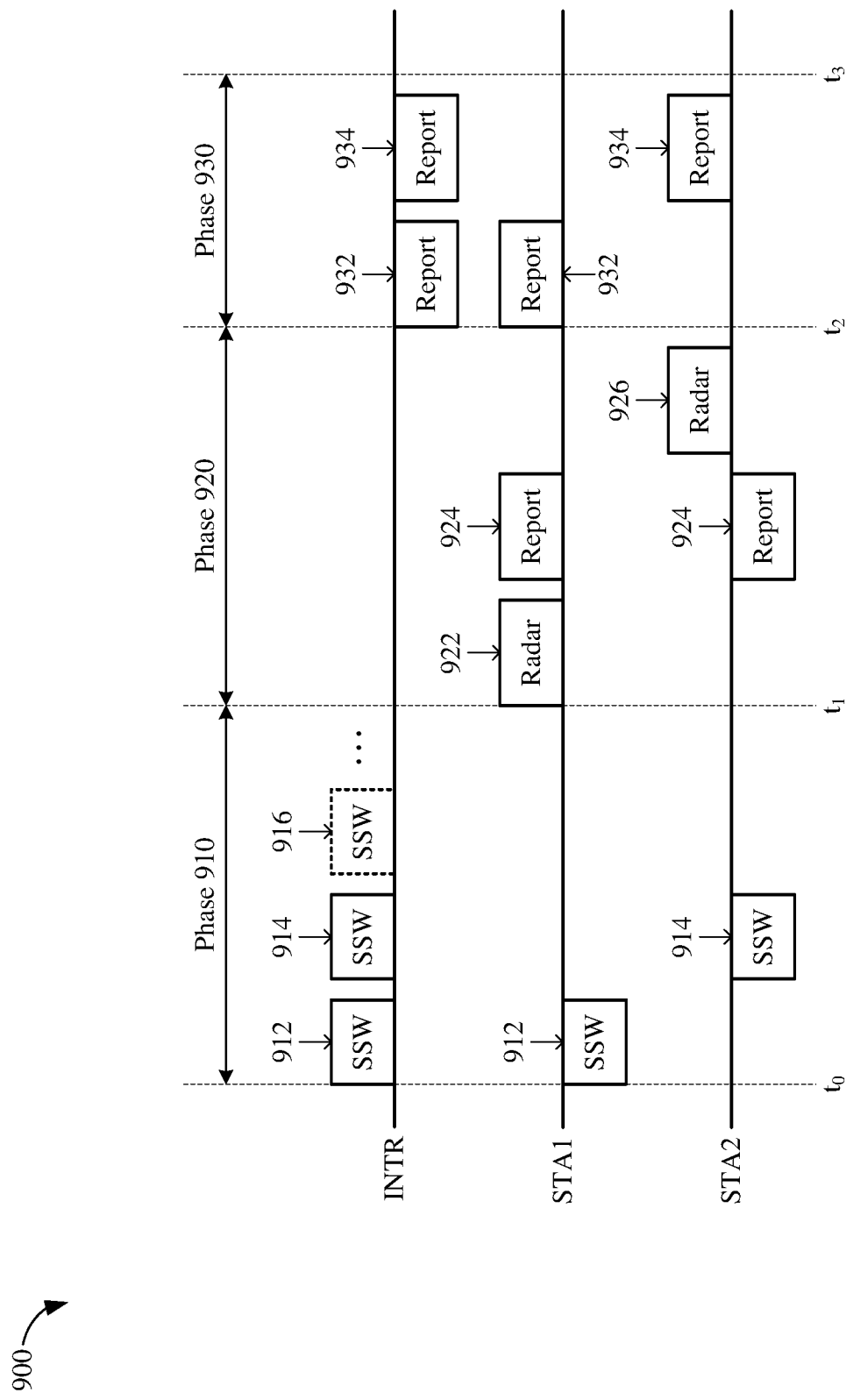
FIG. 9 shows a timing diagram depicting an example radar measurement phase of a radar measurement session.

FIG. 9 shows a timing diagram 900 depicting an example radar measurement phase of a radar measurement session. The radar measurement session may be performed by a radar initiator (INTR) and a number of wireless stations STA1 and STA2. In some implementations, the radar initiator and the wireless stations STA1 and STA2 may belong to a radar system, such as the radar system 700 of FIG. 7. Thus, the radar initiator may be one example of the radar initiator 730 and the wireless stations STA1 and STA2 may be examples of the STAs 710 and 720, respectively, of FIG. 7.

The timing diagram 900 shows a single instance of the radar measurement session that occurs from times $t_0$ to $t_3$. The measurement instance can further be subdivided into a number of phases, including a radar triggering (RT) phase 910, from times $t_0$ to $t_1$, a radar ranging (RR) phase 920, from times $t_1$ to $t_2$, and a measurement reporting (MR) phase 930, from times $t_2$ to $t_3$. In the example of FIG. 9, the RR phase 920 is shown to occur immediately after the RT phase 910, and the MR phase 930 is shown to occur immediately after the RR phase 920. However, in some other implementations, the RT phase 910 and the RR phase 920 may be separated by some duration of time. Still further, in some implementations, the RR phase 920 and the MR phase 930 may be separated by some duration of time.

During the RT phase 910, the radar initiator transmits SSW frames 912 and 914 to STA1 and STA2, respectively. More specifically, the SSW frame 912 may be transmitted, using beamforming, in the direction of STA1 and the SSW frame 914 may be transmitted, using beamforming, in the direction of STA2. Accordingly, the wireless stations STA1 and STA2 may tune their antennas in the direction of the radar initiator, from times $t_0$ to $t_1$, to receive the SSW frames 912 and 914, respectively, from the radar initiator. In some implementations, each of the SSW frames 912 and 914 may carry radar setup information indicating at least a measurement setup ID associated with the radar measurement session and a measurement instance ID associated with the current measurement instance. With reference for example to FIG. 7, the SSW frame 912 may carry the radar setup information 702 and the SSW frame 914 may carry the radar setup information 704. In some implementations, each of the SSW frames 912 and 914 may further indicate an order in which the wireless stations STA1 and STA2 are to perform respective radar ranging operations. In some implementations, the radar initiator may transmit a number of additional SSW frames 916, prior to the start of the RR phase 920, to prevent other wireless devices in the vicinity from interfering with ranging operations performed by the wireless stations STA1 and STA2.

During the RR phase 920, each of the wireless stations STA1 and STA2 performs a respective ranging operation in accordance with a radar mode associated with the radar measurement session. In the example of FIG. 9, the radar measurement session is associated with the object tracking mode. Accordingly, the wireless stations STA1 and STA2 may coordinate their radar ranging operations to track a target object in the environment. For example, STA1 may perform a first radar ranging operation by transmitting a number of radar pulses 922 in various directions and listening for resulting echoes (not shown for simplicity). In some implementations, STA1 may transmit a radar report frame 924 to STA2 following the first radar ranging operation. The radar report frame 924 may carry ranging information indicating a result of the first radar ranging operation. In some implementations, the ranging information may indicate a distance, direction, or velocity of a target object in relation to STA1. In some other implementations, the ranging information may indicate a distance, direction, or velocity, of the target object in relation to STA2. Immediately after receiving the radar report frame 924 (such as within a short interframe space (SIFS) duration), STA2 may perform a second radar ranging operation by transmitting a number of radar pulses 926 in a narrow range of directions associated with the received ranging information and listening for resulting echoes (not shown for simplicity).

During the MR phase 930, the wireless stations STA1 and STA2 transmit radar report frames 932 and 934, respectively, to the radar initiator. In some implementations, each of the radar report frames 932 and 934 may be transmitted, using beamforming, in the direction of the radar initiator. Each of the radar report frames 932 and 934 may include the measurement instance ID associated with the current measurement instance. In some implementations, the radar report frame 932 may further carry ranging information indicating a result of the radar ranging operation performed, during the RR phase 920, by STA1. For example, such ranging information may indicate a distance, direction, or velocity of one or more objects in the environment relative to STA1. In some implementations, the radar report frame 934 may further carry ranging information indicating a result of the radar ranging operation performed, during the RR phase 920, by STA2. For example, such ranging information may indicate a distance, direction, or velocity of one or more objects in the environment relative to STA2. With reference for example to FIG. 7, the radar report frame 932 may carry the ranging information 712 and the radar report frame 934 may carry the ranging information 714.

Figure 10:
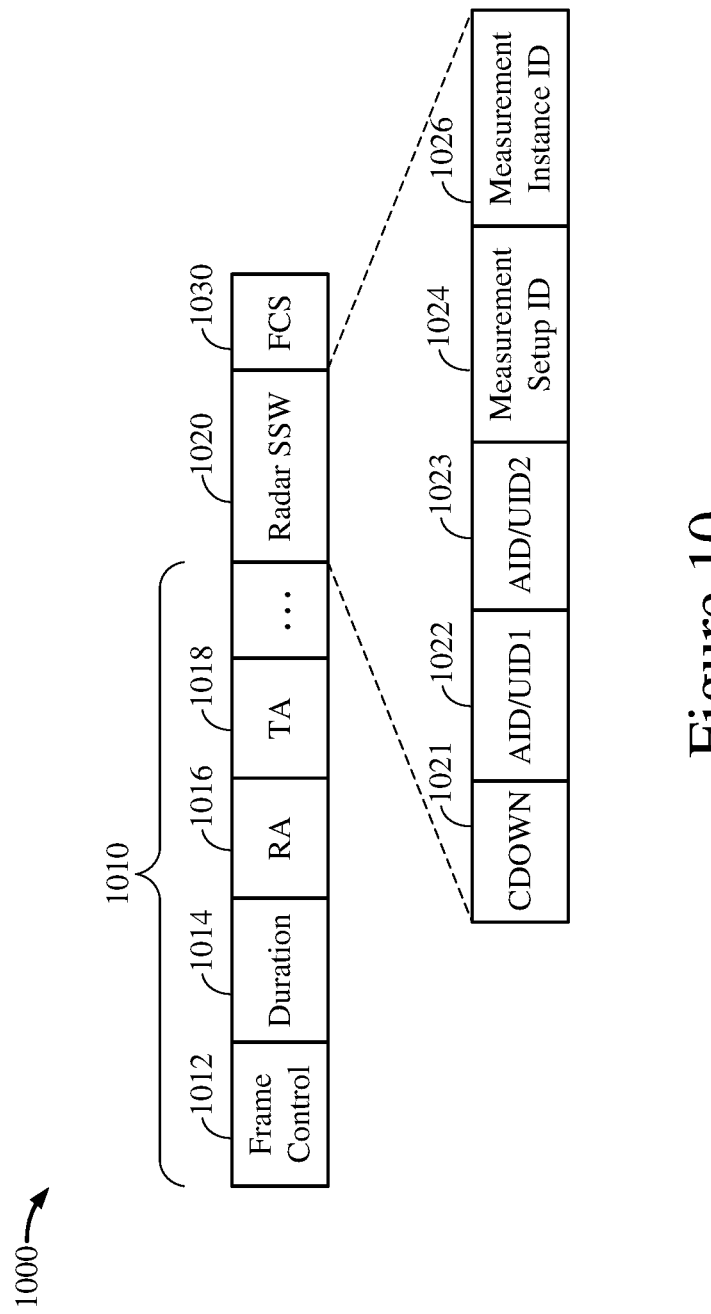
FIG. 10 shows an example sector sweep (SSW) frame.

FIG. 10 shows an example SSW frame 1000. In some implementations, the SSW frame 1000 may be one example of any of the SSW frames 812-816 or 842-846 of FIG. 8 or any of the SSW frames 912-916 of FIG. 9. More specifically, the SSW frame 1000 may be transmitted by a radar initiator, at the start of a radar measurement phase (also referred to herein as a radar triggering phase) of a radar measurement session, to trigger a radar STA to perform a respective radar ranging operation or otherwise scan an environment for one or more objects.

The SSW frame 1000 includes a MAC header 1010, a radar SSW field 1020, and a frame check sequence (FCS) 1030. The MAC header 1010 includes a frame control field 1012, a duration field 1014, a receiver address (RA) field 1016, and a transmitter address (TA) field 1018. In some implementations, the radar SSW field 1020 may carry radar setup information associated with the radar measurement session. For example, the radar SSW field 1020 may include a countdown (CDOWN) subfield 1021, a first STA identification (AID/UID1) subfield 1022, a second STA identification (AID/UID2) subfield 1023, a measurement setup ID subfield 1024, and a measurement instance ID subfield 1026. In some implementations, the radar SSW field 1020 may further include one or more reserved bits (not shown for simplicity).

The CDOWN subfield 1021 indicates a number of remaining SSW frames in the sequence. With reference for example to FIG. 9, each of the SSW frames 912-916 may include a CDOWN subfield 1021 that carries a respective countdown value indicating a respective number of remaining SSW frames to be transmitted by the radar initiator during the RT phase 910. Similarly, with reference to FIG. 8, each of the SSW frames 812-816 may include a CDOWN subfield 1021 that carries a respective countdown value indicating a respective number of remaining SSW frames to be transmitted by the radar initiator during the RT phase 810 of the measurement instance 801, and each of the SSW frames 842-846 may include a CDOWN subfield 1021 that carries a respective countdown value indicating a respective number of remaining SSW frames to be transmitted by the radar initiator during the RT phase 840 of the measurement instance 802.

The STA identification subfields 1022 and 1024 may indicate an order in which radar STAs participating in the radar measurement session are to perform respective radar ranging operations. For example, the AID/UID1 subfield 1022 may indicate the AID (or UID) value of the radar STA that is scheduled to perform the first (or initial) radar ranging operation associated with the current measurement instance, whereas the AID/UID2 subfield 1024 may indicate the AID (or UID) value of the radar STA that is scheduled to perform the second (or subsequent) radar ranging operation associated with the current measurement instance. With reference for example to FIG. 9, each of the SSW frames 912 and 914 may include an AID/UID1 subfield 1022 indicating the AID (or UID) assigned to STA1 and an AID/UID2 subfield 1024 indicating the AID (or UID) assigned to STA2.

The measurement setup ID subfield 1024 may indicate the measurement setup ID associated with the radar measurement session. With reference for example to FIG. 8, each of the SSW frames 812, 814, 842, and 844 may include a measurement setup ID subfield 1024 that carries the same measurement setup ID. The measurement instance ID subfield 1026 may indicate the measurement instance ID associated with the current instance of the radar measurement session. With reference for example to FIG. 8, each of the SSW frames 812 and 814 may include a measurement setup ID subfield 1024 that carries the measurement instance ID associated with the measurement instance 801 and each of the SSW frames 842 and 844 may include a measurement setup ID subfield 1024 that carries the measurement instance ID associated with the measurement instance 802.

Figure 11:
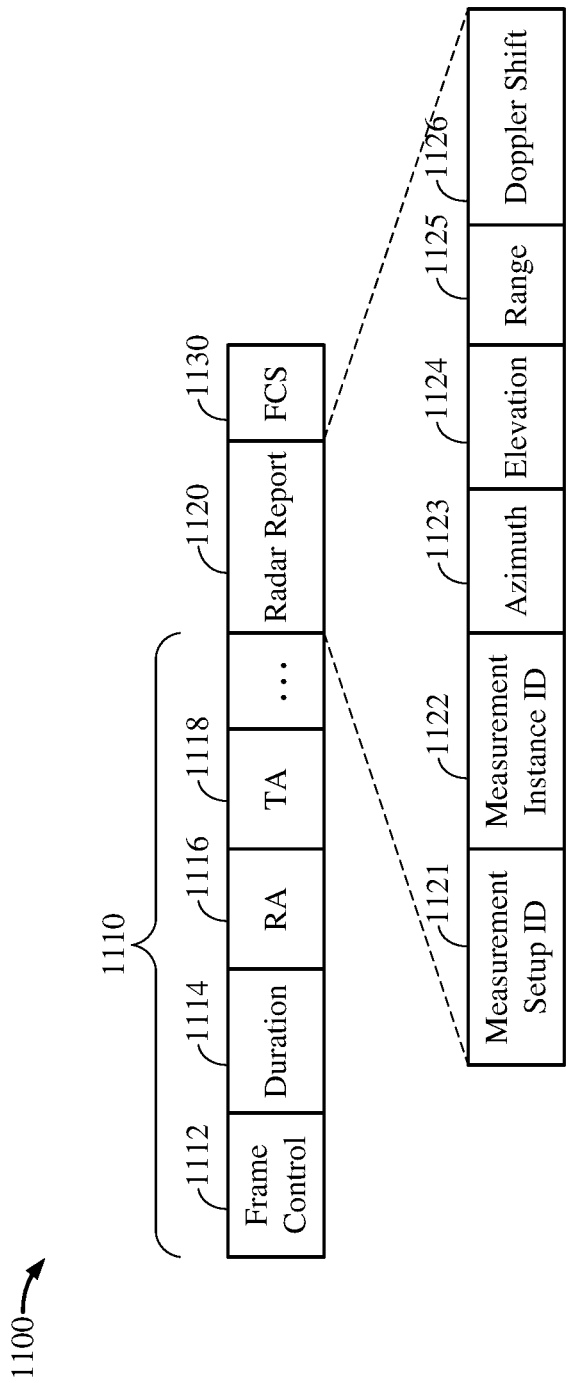
FIG. 11 shows an example radar report frame.

FIG. 11 shows an example radar report frame 1100. In some implementations, the radar report frame 1100 may be one example of any of the radar report frames 832, 834, 862, or 864 of FIG. 8 or any of the radar report frames 924, 932 or 934 of FIG. 9. More specifically, the radar report frame 1100 may be transmitted by a radar STA, at the end of a radar measurement phase (also referred to herein as a measurement reporting phase) of a radar measurement session, to report ranging information or other results of a radar ranging operation back to a radar initiator.

The radar report frame 1100 includes a MAC header 1110, a radar report field 1120, and an FCS 1130. The MAC header 1110 includes a frame control field 1112, a duration field 1114, an RA field 1116, and a TA field 1118. In some implementations, the radar report field 1120 may carry ranging information associated with a radar ranging operation. For example, the radar report field 1120 may include a measurement setup ID subfield 1121, a measurement instance ID subfield 1122, an azimuth subfield 1123, an elevation subfield 1124, a range subfield 1125, and a Doppler shift subfield 1126. In some implementations, the radar report field 1102 may further include one or more reserved bits (not shown for simplicity).

The measurement setup ID subfield 1121 may indicate the measurement setup ID associated with the radar measurement session. With reference for example to FIG. 8, each of the radar report frames 832, 834, 862, and 864 may include a measurement setup ID subfield 1121 that carries the same measurement setup ID. The measurement instance ID subfield 1122 may indicate the measurement instance ID associated with the current instance of the radar measurement session. With reference for example to FIG. 8, each of the radar report frames 832 and 834 may include a measurement setup ID subfield 1122 that carries the measurement instance ID associated with the measurement instance 801 and each of the radar report frames 862 and 864 may include a measurement setup ID subfield 1122 that carries the measurement instance ID associated with the measurement instance 802.

The azimuth and elevation subfields 1123 and 1124 may indicate a direction of an object in relation to the radar STA. More specifically, the azimuth subfield 1123 may indicate an azimuth component of the direction of the object and the elevation subfield 1124 may indicate an elevation component of the direction of the object. With reference for example to FIG. 9, the radar report 932 may include azimuth and elevation subfields 1123 and 1124 that carry azimuth and elevation information indicating a direction of an object in relation to STA1, whereas the radar report 934 may include azimuth and elevation subfields 1123 and 1124 that carry azimuth and elevation information indicating a direction of the object in relation to STA2. In some implementations, the radar report frame 924 may include azimuth and elevation subfields 1123 and 1124 that carry azimuth and elevation information indicating a direction of the object in relation to STA1. In some other implementations, the radar report frame 924 may include azimuth and elevation subfields 1123 and 1124 that carry azimuth and elevation information indicating a direction of the object in relation to STA2.

The range subfield 1125 may indicate a distance of an object in relation to the radar STA. With reference for example to FIG. 9, the radar report 932 may include a range subfield 1125 that carries distance information indicating a distance of an object in relation to STA1, whereas the radar report 934 may include a range subfield 1125 that carries distance information indicating a distance of the object in relation to STA2. In some implementations, the radar report frame 924 may include a range subfield 1125 that carries distance information indicating a distance of the object in relation to STA1. In some other implementations, the radar report frame 924 may include a range subfield 1125 that carries distance information indicating a distance of the object in relation to STA2.

The Doppler shift subfield 1126 may indicate a velocity of an object in relation to the radar STA. With reference for example to FIG. 9, the radar report 932 may include a Doppler shift subfield 1126 that carries velocity information indicating a velocity of an object in relation to STA1, whereas the radar report 934 may include a Doppler shift subfield 1126 that carries velocity information indicating a velocity of the object in relation to STA2. In some implementations, the radar report frame 924 may include a Doppler shift subfield 1126 that carries velocity information indicating a velocity of the object in relation to STA1. In some other implementations, the radar report frame 924 may include a Doppler shift subfield 1126 that carries velocity information indicating a velocity of the object in relation to STA2.

Figure 12A:
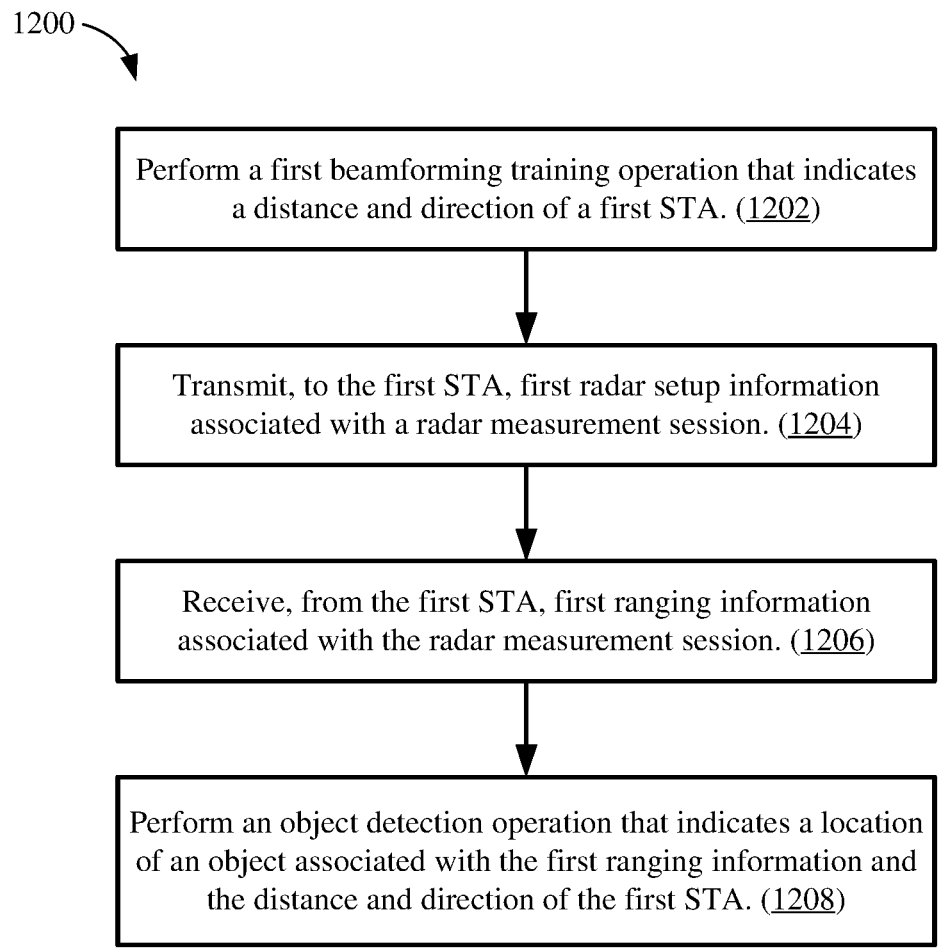
FIG. 12A shows an illustrative flowchart depicting an example radar-based RF sensing operation.

FIG. 12A shows an illustrative flowchart depicting an example radar-based RF sensing operation 1200. The example operation 1200 may be performed by a wireless communication device such as any of the radar initiators 530, 630, or 730 of FIGS. 5, 6, and 7, respectively.

The wireless communication device performs a first beamforming training operation that indicates a distance and direction of a first STA (1202). The wireless communication device transmits, to the first STA, first radar setup information associated with a radar measurement session (1204). In some implementations, the first radar setup information may be carried in an SSW frame. In some implementations, the first radar setup information may include a measurement setup ID associated with the radar measurement session. The wireless communication device receives, from the first STA, first ranging information associated with the radar measurement session (1206). The wireless communication device further performs an object detection operation that indicates a location of an object associated with the first ranging information and the distance and direction of the first STA (1208).

In some aspects, the first radar setup information may indicate a timing of a radar ranging operation performed by the first STA, where the radar ranging operation is associated with the first ranging information. In some implementations, the wireless communication device may further transmit, to the first STA, antenna configuration information indicating a range of scanning directions associated with the radar ranging operation. In some implementations, the wireless communication device may transmit a number of packets following the transmission of the first radar setup information, where the number of packets is associated with the timing of the radar ranging operation. In some implementations, the first radar setup information may include a measurement instance ID associated with the radar ranging operation. In some implementations, the first ranging information also may include the measurement instance ID.

Figure 12B:
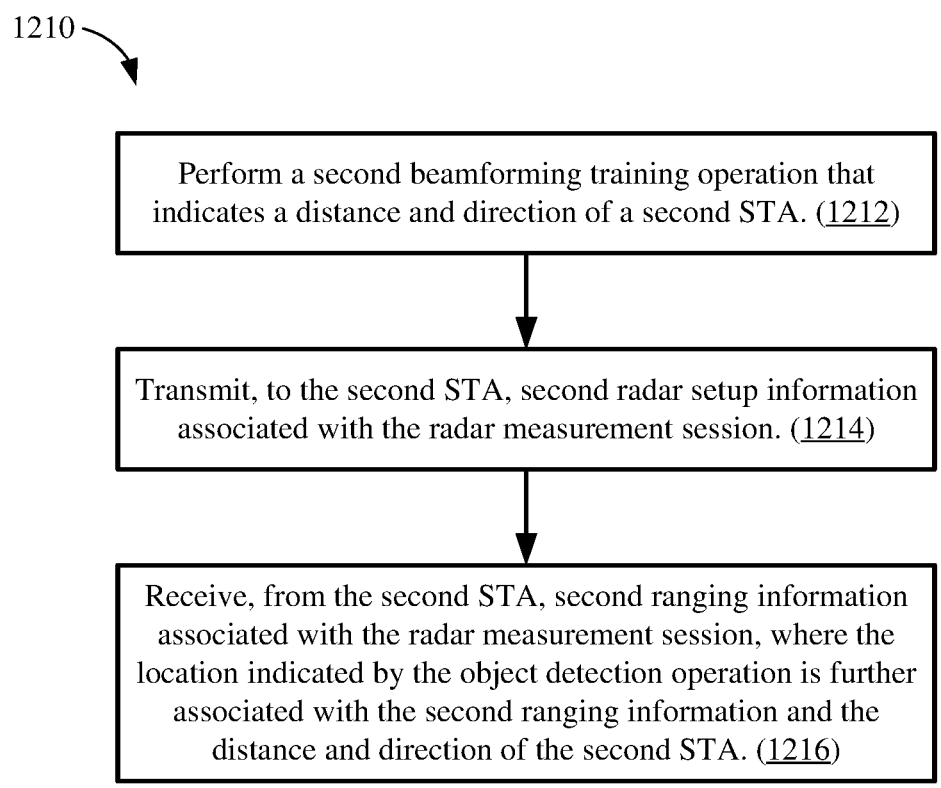
FIG. 12B shows an illustrative flowchart depicting an example radar-based RF sensing operation.

FIG. 12B shows an illustrative flowchart depicting an example radar-based RF sensing operation 1210. The example operation 1210 may be performed by a wireless communication device such as any of the radar initiators 530, 630, or 730 of FIGS. 5, 6, and 7, respectively. In some implementations, the example operation 1210 may be performed after the radar-based RF sensing operation 1200.

The wireless communication device performs a second beamforming training operation that indicates a distance and direction of a second STA (1212). The wireless communication device transmits, to the second STA, second radar setup information associated with the radar measurement session (1214). The wireless communication device further receives, from the second STA, second ranging information associated with the radar measurement session, where the location indicated by the object detection operation is further associated with the second ranging information and the distance and direction of the second STA (1216).

In some aspects, each of the first radar setup information and the second radar setup information may indicate an order of first and second radar ranging operations performed by the first and second STAs, respectively, where the first radar ranging operation is associated with the first ranging information and the second radar ranging operation is associated with the second ranging information. In some implementations, the first and second radar ranging operations may be performed concurrently. In some other implementations, the first and second radar ranging operations may be performed at different times. In some implementations, the wireless communication device further transmits, to each of the first and second STAs, position information indicating a relative distance and direction of the first STA to the second STA.

Figure 13A:
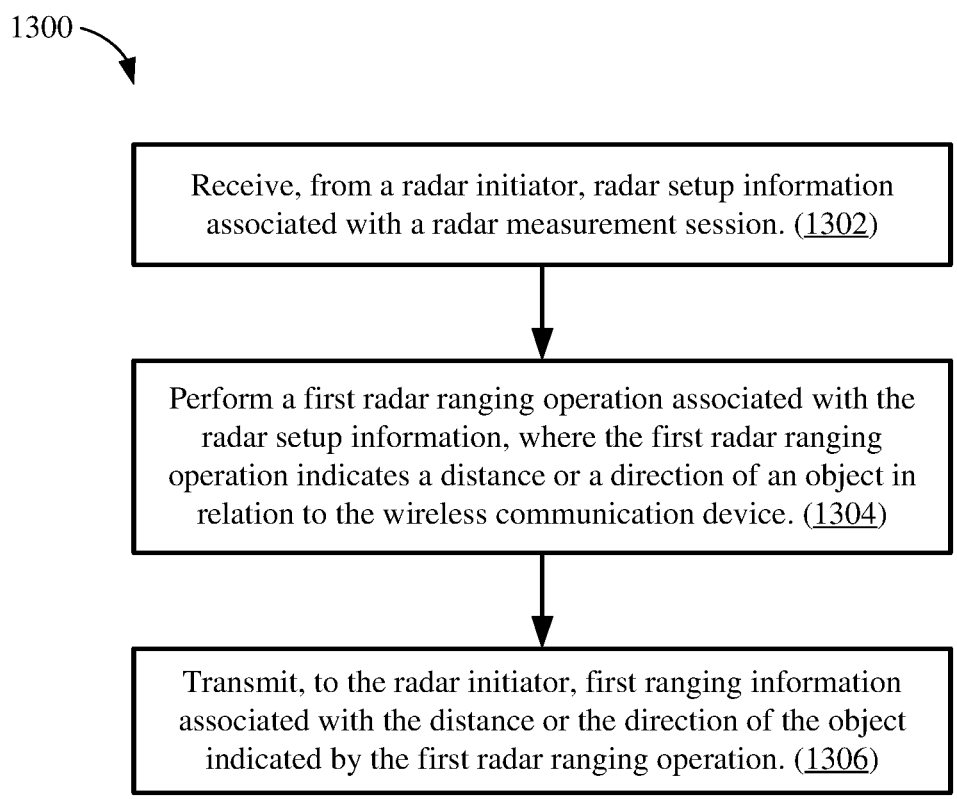
FIG. 13A shows an illustrative flowchart depicting an example radar-based RF sensing operation.

FIG. 13A shows an illustrative flowchart depicting an example radar-based RF sensing operation 1300. The example operation 1300 may be performed by a wireless communication device such as any of the radar STAs 510 or 520 of FIG. 5, any of the radar STAs 610 or 620 of FIG. 6, or any of the radar STAs 710 or 720 of FIG. 7.

The wireless communication device receives, from a radar initiator, radar setup information associated with a radar measurement session (1302). The wireless communication device performs a first radar ranging operation associated with the radar setup information, where the first radar ranging operation indicates a distance or a direction of an object in relation to the wireless communication device (1304). The wireless communication device transmits, to the radar initiator, first ranging information associated with the distance or the direction of the object indicated by the first radar ranging operation (1306).

In some implementations, the radar setup information may be carried in an SSW frame. In some implementations, the radar setup information may include a measurement setup ID associated with the radar measurement session. In some implementations, the radar setup information may indicate a timing of the first radar ranging operation. In some implementations, the wireless communication device may receive, from the radar initiator, antenna configuration information indicating a range of scanning directions associated with the first radar ranging operation. In some implementations, the radar setup information may include a measurement instance ID associated with the first radar ranging operation. In some implementations, the first ranging information also may include the measurement instance ID.

In some aspects, the radar setup information may indicate an order of the first radar ranging operation and a second radar ranging operation performed by a STA associated with the radar measurement session. In some implementations, the first and second radar ranging operations may be performed concurrently. In some other implementations, the second radar ranging operation may be performed after the first radar ranging operation.

Figure 13B:
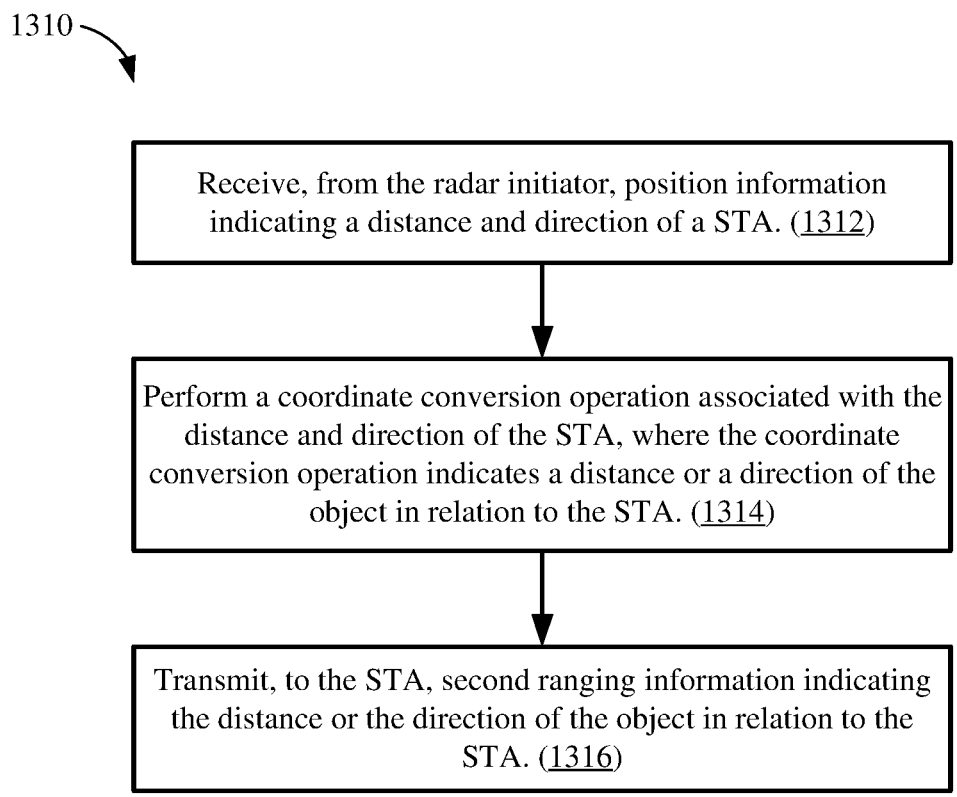
FIG. 13B shows an illustrative flowchart depicting an example radar-based RF sensing operation.

FIG. 13B shows an illustrative flowchart depicting an example radar-based RF sensing operation 1310. The example operation 1310 may be performed by a wireless communication device such as any of the radar STAs 510 or 520 of FIG. 5, any of the radar STAs 610 or 620 of FIG. 6, or any of the radar STAs 710 or 720 of FIG. 7. In some implementations, the example operation 1310 may be performed after the radar-based RF sensing operation 1300.

The wireless communication device receives, from the radar initiator, position information indicating a distance and direction of the STA (1312). The wireless communication device performs a coordinate conversion operation associated with the distance and direction of the STA, where the coordinate conversion operation indicates a distance or a direction of the object in relation to the STA (1314). The wireless communication device transmits, to the STA, second ranging information indicating the distance or the direction of the object in relation to the STA (1316).

Figure 14:
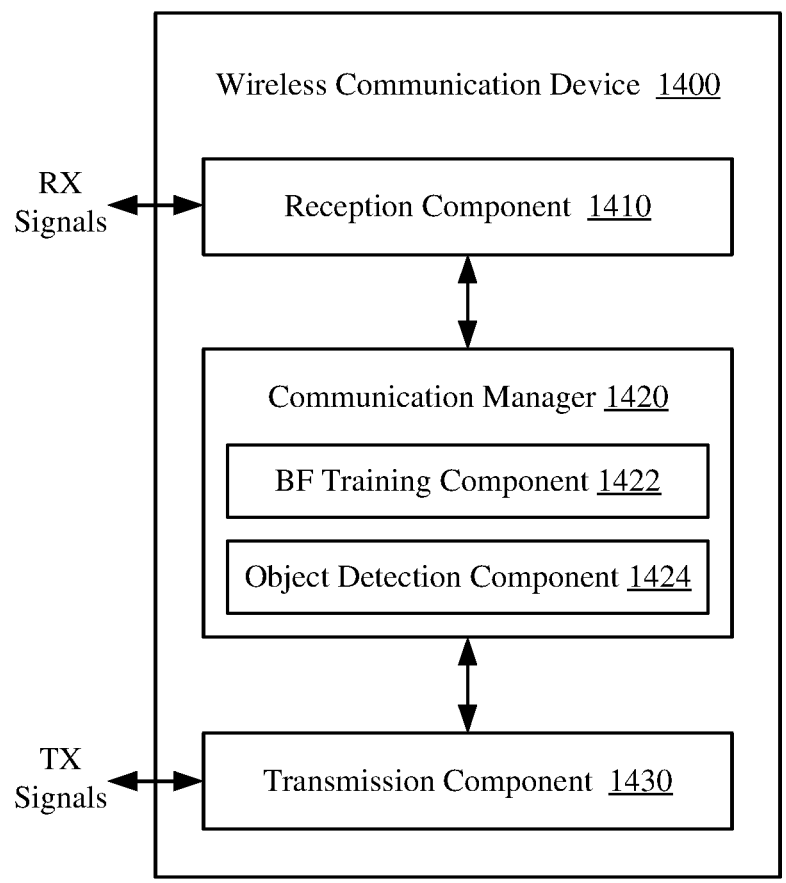
FIG. 14 shows a block diagram of an example wireless communication device.

FIG. 14 shows a block diagram of an example wireless communication device 1400. In some implementations, the wireless communication device 1400 may be configured to perform the operation 1200 described with reference to FIG. 12. The wireless communication device 1400 can be an example implementation of any of the APs 110 or 300 of FIGS. 1 and 3, respectively, or any of the radar initiators 530, 630, or 730 of FIGS. 5, 6, and 7, respectively. More specifically, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a transmission component 1430. The communication manager 1420 further includes a beamforming (BF) training component 1422 and an object detection component 1424. Portions of one or more of the components 1422 or 1424 may be implemented at least in part in hardware or firmware. In some implementations, one or more of the components 1422 or 1424 are implemented at least in part as software stored in a memory (such as the memory 240 of FIG. 2 or the memory 330 of FIG. 3). For example, portions of one or more of the components 1422 and 1424 can be implemented as non-transitory instructions (or "code") executable by a processor (such as the processor 320 of FIG. 3) to perform the functions or operations of the respective component.

The reception component 1410 is configured to receive RX signals from one or more other wireless communication devices and the transmission component 1430 is configured to transmit TX signals to one or more other wireless communication devices. In some implementations, the transmission component 1430 may transmit, to a STA, radar setup information associated with a radar measurement session. In some implementations, the reception component 1410 may receive, from the STA, ranging information associated with the radar measurement session. The communication manager 1420 is configured to manage wireless communications with one or more other wireless communication devices. In some implementations, the BF training component 1422 may perform a beamforming training operation that indicates a distance and direction of the STA; and the object detection component 1424 may perform an object detection operation that indicates a location of an object associated with the ranging information and the distance and direction of the STA.

Figure 15:
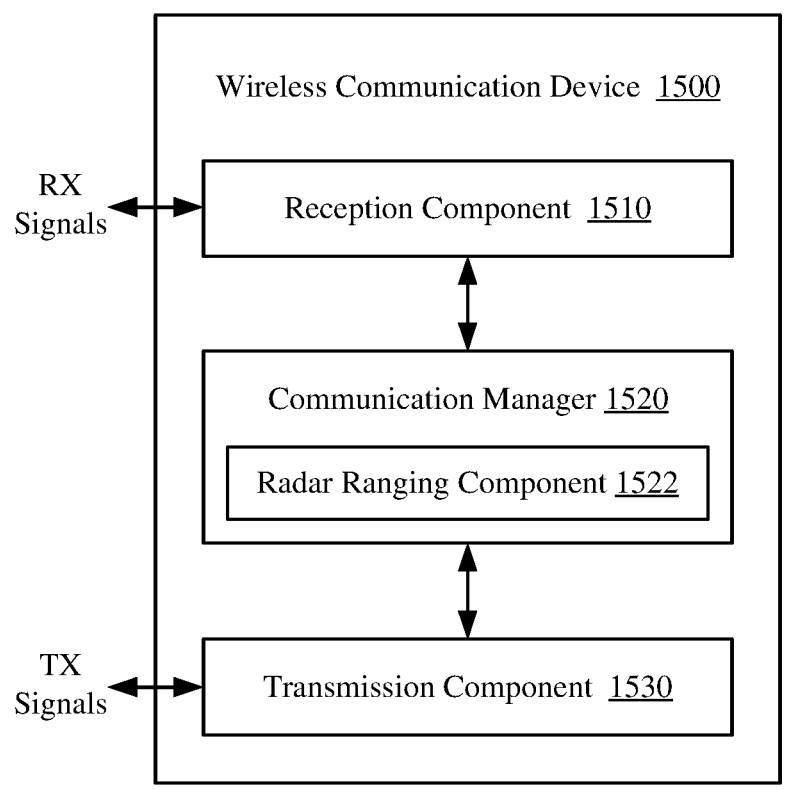
FIG. 15 shows a block diagram of an example wireless communication device.

FIG. 15 shows a block diagram of an example wireless communication device 1500. In some implementations, the wireless communication device 1500 may be configured to perform the operation 1300 described with reference to FIG. 13. The wireless communication device 1500 can be an example implementation of any of the STAs 120*a*-120*i* of FIG. 1, the STA 200 of FIG. 2, any of the radar STAs 510 or 520 of FIG. 5, any of the radar STAs 610 or 620 of FIG. 6, or any of the radar STAs 710 or 720 of FIG. 7. More specifically, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a transmission component 1530. The communication manager 1520 further includes a radar ranging component 1522. Portions of the radar ranging component 1522 may be implemented at least in part in hardware or firmware. In some implementations, the radar ranging component 1522 is implemented at least in part as software stored in a memory (such as the memory 240 of FIG. 2 or the memory 330 of FIG. 3). For example, portions of the radar ranging component 1522 can be implemented as non-transitory instructions (or "code") executable by a processor (such as the processor 320 of FIG. 3) to perform the functions or operations of the respective component.

The reception component 1510 is configured to receive RX signals from one or more other wireless communication devices. In some implementations, the reception component 1510 may receive, from a radar initiator, radar setup information associated with a radar measurement session. The communication manager 1520 is configured to manage wireless communications with one or more other wireless communication devices. In some implementations, the radar ranging component 1522 may perform a radar ranging operation associated with the radar setup information, where the radar ranging operation indicates a distance or a direction of an object in relation to the wireless communication device. The transmission component 1530 is configured to transmit TX signals to one or more other wireless communication devices. In some implementations, the transmission component 1530 may transmit, to the radar initiator, ranging information associated with the distance or the direction of the object indicated by the radar ranging operation.

Implementation examples are described in the following numbered clauses:

1. A method for wireless communication by a wireless communication device, including:
   performing a first beamforming training operation that indicates a distance and direction of a first wireless station (STA);
   transmitting, to the first STA, first radar setup information associated with a radar measurement session;
   receiving, from the first STA, first ranging information associated with the radar measurement session; and
   performing an object detection operation that indicates a location of an object associated with the first ranging information and the distance and direction of the first STA.
2. The method of clause 1, where the first radar setup information is carried in a sector sweep (SSW) frame.
3. The method of any of clauses 1 or 2, where the first radar setup information includes a measurement setup identifier (ID) associated with the radar measurement session.
4. The method of any of clauses 1-3, where the first radar setup information indicates a timing of a radar ranging operation performed by the first STA, the radar ranging operation being associated with the first ranging information.
5. The method of any of clauses 1-4, further including:
   transmitting, to the first STA, antenna configuration information indicating a range of scanning directions associated with the radar ranging operation.
6. The method of any of clauses 1-5, further including:
   transmitting a number of packets following the transmission of the first radar setup information, the number of packets being associated with the timing of the radar ranging operation.
7. The method of any of clauses 1-6, where the first radar setup information includes a measurement instance ID associated with the radar ranging operation.
8. The method of any of clauses 1-7, where the first ranging information includes the measurement instance ID.
9. The method of any of clauses 1-8, where the first ranging information indicates a distance or a direction of the object in relation to the first STA.
10. The method of any of clauses 1-9, further including:
    performing a second beamforming training operation that indicates a distance and direction of a second STA;
    transmitting, to the second STA, second radar setup information associated with the radar measurement session; and
    receiving, from the second STA, second ranging information associated with the radar measurement session, the location indicated by the object detection operation being further associated with the second ranging information and the distance and direction of the second STA.
11. The method of any of clauses 1-10, each of the first radar setup information and the second radar setup information indicates an order of first and second radar ranging operations performed by the first and second STAs, respectively, the first radar ranging operation being associated with the first ranging information and the second radar ranging operation being associated with the second ranging information.
12. The method of any of clauses 1-10, where the first and second radar ranging operations are performed concurrently.
13. The method of any of clauses 1-10, where the first and second radar ranging operations are performed at different times.
14. The method of any of clauses 1-10 or 13, further including:
    transmitting, to each of the first and second STAs, position information indicating a relative distance and direction of the first STA to the second STA.
15. A wireless communication device, including:
    an interface configured to:
       transmit, to a first wireless station (STA), first radar setup information associated with a radar measurement session; and
       receive, from the first STA, first ranging information associated with the radar measurement session; and
    a processing system configured to:
       perform a first beamforming training operation that indicates a distance and direction of the first STA; and
       perform an object detection operation that indicates a location of an object associated with the first ranging information and the distance and direction of the first STA.
16. The wireless communication device of clause 15, where:
    the processing system is further configured to perform a second beamforming training operation that indicates a distance and direction of a second STA; and
    the interface is further configured to:
       transmit, to the second STA, second radar setup information associated with the radar measurement session; and
       receive, from the second STA, second ranging information associated with the radar measurement session, the location indicated by the object detection operation being further associated with the second ranging information and the distance and direction of the second STA.
17. A method performed by a wireless communication device, including:
    receiving, from a radar initiator, radar setup information associated with a radar measurement session;
    performing a first radar ranging operation associated with the radar setup information, the first radar ranging operation indicating a distance or a direction of an object in relation to the wireless communication device; and
    transmitting, to the radar initiator, first ranging information associated with the distance or the direction of the object indicated by the first radar ranging operation.
18. The method of clause 17, where the radar setup information is carried in a sector sweep (SSW) frame.
19. The method of any of clauses 17 or 18, where the radar setup information includes a measurement setup identifier (ID) associated with the radar measurement session.
20. The method of any of clauses 17-19, where the radar setup information indicates a timing of the first radar ranging operation.
21. The method of any of clauses 17-20, further including:
    receiving, from the radar initiator, antenna configuration information indicating a range of scanning directions associated with the first radar ranging operation.
22. The method of any of clauses 17-21, where the radar setup information includes a measurement instance ID associated with the first radar ranging operation.

23. The method of any of clauses 17-22, where the first ranging information includes the measurement instance ID.
24. The method of any of clauses 17-23, where the radar setup information indicates an order of the first radar ranging operation and a second radar ranging operation performed by a wireless station (STA) associated with the radar measurement session.
25. The method of any of clauses 17-24, where the first and second radar ranging operations are performed concurrently.
26. The method of any of clauses 17-24, where the second radar ranging operation is performed after the first radar ranging operation.
27. The method of any of clauses 17-24 or 26, further including:
receiving, from the radar initiator, position information indicating a distance and direction of the STA;
performing a coordinate conversion operation associated with the distance and direction of the STA, the coordinate conversion operation indicating a distance or a direction of the object in relation to the STA; and
transmitting, to the STA, second ranging information indicating the distance or the direction of the object in relation to the STA.
28. A wireless communication device, including:
an interface configured to receive, from a radar initiator, radar setup information associated with a radar measurement session; and
a processing system configured to perform a first radar ranging operation associated with the radar setup information, the first radar ranging operation indicating a distance or a direction of an object in relation to the wireless communication device;
the interface being further configured to transmit, to the radar initiator, first ranging information associated with the distance or the direction of the object indicated by the first radar ranging operation.
29. The wireless communication device of clause 28, where the radar setup information indicates an order of the first radar ranging operation and a second radar ranging operation performed by a wireless station (STA) associated with the radar measurement session.
30. The wireless communication device of any of clauses 28 or 29, where:
the interface is further configured to receive, from the radar initiator, position information indicating a distance and direction of the STA;
the processing system is further configured to perform a coordinate conversion operation associated with the distance and direction of the STA, the coordinate conversion operation indicating a distance or a direction of the object in relation to the STA; and
the interface is further configured to transmit, to the STA, second ranging information indicating the distance or the direction of the object in relation to the STA.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method performed by a wireless communication device, comprising:
performing a first beamforming training operation that indicates a distance and direction of a first wireless station (STA);
transmitting, to the first STA, first radar setup information associated with a radar measurement session, wherein the first radar setup information includes a measurement setup identifier (ID) associated with the radar measurement session;
receiving, from the first STA, first ranging information associated with the radar measurement session; and performing an object detection operation that indicates a location of an object associated with the first ranging information and the distance and direction of the first STA.

2. The method of claim 1, wherein the first radar setup information is carried in a sector sweep (SSW) frame.

3. The method of claim 1, wherein the first radar setup information indicates a timing of a radar ranging operation performed by the first STA, the radar ranging operation being associated with the first ranging information.

4. The method of claim 3, further comprising:
transmitting, to the first STA, antenna configuration information indicating a range of scanning directions associated with the radar ranging operation.

5. The method of claim 3, further comprising:
transmitting a number of packets following the transmission of the first radar setup information, the number of packets being associated with the timing of the radar ranging operation.

6. The method of claim 3, wherein the first radar setup information includes a measurement instance ID associated with the radar ranging operation.

7. The method of claim 6, wherein the first ranging information includes the measurement instance ID.

8. The method of claim 1, wherein the first ranging information indicates a distance or a direction of the object in relation to the first STA.

9. The method of claim 1, further comprising:
performing a second beamforming training operation that indicates a distance and direction of a second STA;
transmitting, to the second STA, second radar setup information associated with the radar measurement session; and
receiving, from the second STA, second ranging information associated with the radar measurement session, the location indicated by the object detection operation being further associated with the second ranging information and the distance and direction of the second STA.

10. The method of claim 9, wherein each of the first radar setup information and the second radar setup information indicates an order of first and second radar ranging operations performed by the first and second STAs, respectively, the first radar ranging operation being associated with the first ranging information and the second radar ranging operation being associated with the second ranging information.

11. The method of claim 10, wherein the first and second radar ranging operations are performed concurrently.

12. The method of claim 10, wherein the first and second radar ranging operations are performed at different times.

13. The method of claim 12, further comprising:
transmitting, to each of the first and second STAs, position information indicating a relative distance and direction of the first STA to the second STA.

14. A wireless communication device, comprising:
an interface configured to:
transmit, to a first wireless station (STA), first radar setup information associated with a radar measurement session; and
receive, from the first STA, first ranging information associated with the radar measurement session, wherein the first radar setup information includes a measurement setup identifier (ID) associated with the radar measurement session; and a processing system configured to:
perform a first beamforming training operation that indicates a distance and direction of the first STA; and
perform an object detection operation that indicates a location of an object associated with the first ranging information and the distance and direction of the first STA.

15. The wireless communication device of claim 14, wherein:
the processing system is further configured to perform a second beamforming training operation that indicates a distance and direction of a second STA; and
the interface is further configured to:
transmit, to the second STA, second radar setup information associated with the radar measurement session; and
receive, from the second STA, second ranging information associated with the radar measurement session, the location indicated by the object detection operation being further associated with the second ranging information and the distance and direction of the second STA.

16. A method performed by a wireless communication device, comprising:
receiving, from a radar initiator, radar setup information associated with a radar measurement session, wherein the radar setup information includes a measurement setup identifier (ID) associated with the radar measurement session;
performing a first radar ranging operation associated with the radar setup information, the first radar ranging operation indicating a distance or a direction of an object in relation to the wireless communication device; and
transmitting, to the radar initiator, first ranging information associated with the distance or the direction of the object indicated by the first radar ranging operation.

17. The method of claim 16, wherein the radar setup information is carried in a sector sweep (SSW) frame.

18. The method of claim 16, wherein the radar setup information includes a measurement setup identifier (ID) associated with the radar measurement session.

19. The method of claim 16, wherein the radar setup information indicates a timing of the first radar ranging operation.

20. The method of claim 16, further comprising:
receiving, from the radar initiator, antenna configuration information indicating a range of scanning directions associated with the first radar ranging operation.

21. The method of claim 16, wherein the radar setup information includes a measurement instance ID associated with the first radar ranging operation.

22. The method of claim 21, wherein the first ranging information includes the measurement instance ID.

23. The method of claim 16, wherein the radar setup information indicates an order of the first radar ranging operation and a second radar ranging operation performed by a wireless station (STA) associated with the radar measurement session.

24. The method of claim 23, wherein the first and second radar ranging operations are performed concurrently.

25. The method of claim 23, wherein the second radar ranging operation is performed after the first radar ranging operation.

26. The method of claim 25, further comprising:
receiving, from the radar initiator, position information indicating a distance and direction of the STA;
performing a coordinate conversion operation associated with the distance and direction of the STA, the coordinate conversion operation indicating a distance or a direction of the object in relation to the STA; and
transmitting, to the STA, second ranging information indicating the distance or the direction of the object in relation to the STA.

27. A wireless communication device, comprising:
an interface configured to receive, from a radar initiator, radar setup information associated with a radar measurement session, wherein the radar setup information includes a measurement setup identifier (ID) associated with the radar measurement session; and
a processing system configured to perform a first radar ranging operation associated with the radar setup information, the first radar ranging operation indicating a distance or a direction of an object in relation to the wireless communication device;
the interface being further configured to transmit, to the radar initiator, first ranging information associated with the distance or the direction of the object indicated by the first radar ranging operation.

28. The wireless communication device of claim 27, wherein the radar setup information indicates an order of the first radar ranging operation and a second radar ranging operation performed by a wireless station (STA) associated with the radar measurement session.

29. The wireless communication device of claim 28, wherein:
the interface is further configured to receive, from the radar initiator, position information indicating a distance and direction of the STA;
the processing system is further configured to perform a coordinate conversion operation associated with the distance and direction of the STA, the coordinate conversion operation indicating a distance or a direction of the object in relation to the STA; and
the interface is further configured to transmit, to the STA, second ranging information indicating the distance or the direction of the object in relation to the STA.

* * * * *